US010655385B2

(12) United States Patent
McNeill et al.

(10) Patent No.: US 10,655,385 B2
(45) Date of Patent: May 19, 2020

(54) DUAL CORD OPERATING SYSTEM FOR AN ARCHITECTURAL COVERING

(71) Applicant: Hunter Douglas Inc., Pearl River, NY (US)

(72) Inventors: David B. McNeill, Denver, CO (US); Ronald Holt, Westminster, CO (US); Stephen T. Wisecup, Niwot, CO (US); David Lynch, Centennial, CO (US); Christopher R. Mueller, Thornton, CO (US)

(73) Assignee: HUNTER DOUGLAS INC., Pearl River, NY (US)

( * ) Notice: Subject to any disclaimer, the term of this patent is extended or adjusted under 35 U.S.C. 154(b) by 407 days.

(21) Appl. No.: 15/423,639

(22) Filed: Feb. 3, 2017

(65) Prior Publication Data
US 2017/0241198 A1   Aug. 24, 2017

Related U.S. Application Data

(60) Provisional application No. 62/297,770, filed on Feb. 19, 2016.

(51) Int. Cl.
*E06B 9/36* (2006.01)
*E05F 11/04* (2006.01)
(Continued)

(52) U.S. Cl.
CPC ............. *E06B 9/364* (2013.01); *E05D 15/26* (2013.01); *E05F 11/04* (2013.01); *E05F 11/32* (2013.01);
(Continued)

(58) Field of Classification Search
CPC . E06B 9/364; E06B 9/78; E06B 9/361; E06B 9/38; E06B 9/304; E06B 9/322;
(Continued)

(56) References Cited

U.S. PATENT DOCUMENTS 3,633,646 A * 1/1972 Zilver ..................... E06B 9/305
                                                    160/168.1 R
3,862,655 A * 1/1975 Knapper ................. E06B 9/368
                                                    160/172 V (Continued)

FOREIGN PATENT DOCUMENTS

GB           2157753 A  * 10/1985    ............... E06B 9/32

OTHER PUBLICATIONS

Author Unknown, "Luminette Privacy Sheers and Modern Draperies—Installation, Operation, Care" Hunter Douglas 2010.
Author Unknown, "Luminette Wand Control" Hunter Douglas 2015.

*Primary Examiner* — Johnnie A. Shablack

(57) ABSTRACT

A covering for an architectural opening has a dual cord operating system. The covering may include a head rail, blind panels depending from the head rail, and an operating system. The operating system may include a housing connected to the head rail, a first drive assembly rotatably mounted within the housing and operable to move the blind panels between an extended configuration and a retracted configuration, and a second drive assembly rotatably mounted within the housing and operable to move the blind panels between a closed configuration and an open configuration.

35 Claims, 16 Drawing Sheets

(51) Int. Cl.
| | | |
|---|---|---|
| *E05F 11/32* | (2006.01) | |
| *E05F 17/00* | (2006.01) | |
| *E05D 15/26* | (2006.01) | |
| *E06B 9/262* | (2006.01) | |
| *E06B 9/38* | (2006.01) | |
| *F16H 1/28* | (2006.01) | |
| *F16M 13/02* | (2006.01) | |

(52) U.S. Cl.
CPC ............. *E05F 17/00* (2013.01); *E06B 9/262* (2013.01); *E06B 9/361* (2013.01); *E06B 9/367* (2013.01); *E06B 9/38* (2013.01); *F16H 1/28* (2013.01); *F16M 13/02* (2013.01); *E06B 2009/2622* (2013.01)

(58) Field of Classification Search
CPC ..... E06B 9/32; E06B 9/68; E06B 9/36; E06B 9/368; E06B 2009/785; A47H 5/032
See application file for complete search history.

(56) References Cited

U.S. PATENT DOCUMENTS

| | | | | |
|---|---|---|---|---|
| 3,878,877 A | * | 4/1975 | Bruneau | E06B 9/361 160/168.1 R |
| 3,921,695 A | * | 11/1975 | Debs | E06B 9/322 160/176.1 R |
| 4,122,884 A | * | 10/1978 | Salzmann | E06B 9/36 160/168.1 R |
| 4,193,438 A | * | 3/1980 | Pastore | E06B 9/361 160/168.1 V |
| 4,293,021 A | * | 10/1981 | Arena | E06B 9/362 160/173 V |
| 4,386,644 A | * | 6/1983 | Debs | E06B 9/323 160/174 V |
| 4,657,060 A | * | 4/1987 | Kaucic | E06B 9/361 160/168.1 V |
| 4,844,139 A | * | 7/1989 | John | E06B 9/361 160/168.1 V |
| 4,869,308 A | * | 9/1989 | Chang | E06B 9/307 160/176.1 R |
| 4,936,369 A | * | 6/1990 | Darner | E06B 9/361 160/168.1 R |
| 5,038,843 A | * | 8/1991 | Sommerfeld | E06B 9/361 160/168.1 R |
| 5,095,966 A | * | 3/1992 | Rogers | E06B 9/362 160/168.1 R |
| 5,103,889 A | * | 4/1992 | Ford | E06B 9/305 160/177 R |
| 5,119,868 A | * | 6/1992 | Werner | E06B 9/307 160/115 |
| 5,137,073 A | * | 8/1992 | Huang | E06B 9/324 160/319 |
| 5,465,775 A | * | 11/1995 | Biba | E06B 9/306 160/168.1 R |
| 5,465,779 A | * | 11/1995 | Rozon | E06B 9/326 160/168.1 V |
| 5,472,035 A | * | 12/1995 | Biba | E06B 9/306 160/168.1 R |
| 5,501,262 A | * | 3/1996 | Inaba | E06B 9/323 160/173 R |
| 5,553,649 A | * | 9/1996 | Chisaka | E06B 9/306 160/168.1 R |
| 5,575,323 A | * | 11/1996 | Smuckler | E06B 9/361 160/177 V |
| 5,657,807 A | * | 8/1997 | Hsu | E06B 9/361 16/442 |
| 5,671,793 A | * | 9/1997 | Lee | E06B 9/307 160/168.1 R |
| 5,682,938 A | * | 11/1997 | Hsu | E06B 9/36 160/177 V |
| 5,722,478 A | * | 3/1998 | Claypool | E06B 9/326 160/173 R |
| 5,749,405 A | * | 5/1998 | Huang | E06B 9/303 160/168.1 R |
| 5,797,441 A | * | 8/1998 | Benthin | E06B 9/361 160/173 V |
| 5,845,695 A | * | 12/1998 | Cadorette | E06B 9/361 160/173 V |
| 5,850,863 A | * | 12/1998 | Huang | E06B 9/303 160/168.1 R |
| 5,853,039 A | * | 12/1998 | Fraser | E06B 9/307 160/176.1 V |
| 5,904,198 A | * | 5/1999 | Huang | E06B 9/303 160/168.1 R |
| 6,112,798 A | * | 9/2000 | Cheng | E06B 9/36 160/174 V |
| 6,196,293 B1 | * | 3/2001 | Lee | E06B 9/303 160/168.1 V |
| 6,360,806 B1 | * | 3/2002 | Bowman | E06B 9/36 160/168.1 V |
| 6,516,860 B1 | * | 2/2003 | Weaver | E06B 9/30 160/168.1 R |
| 6,752,194 B1 | * | 6/2004 | Huang | E06B 9/307 160/168.1 R |
| 6,983,784 B2 | * | 1/2006 | Anderson | E06B 9/36 160/168.1 V |
| 8,662,136 B2 | * | 3/2014 | Nevins | F16G 11/00 160/173 R |
| 8,770,255 B2 | * | 7/2014 | Daus | B66D 1/02 160/9 |
| 9,038,696 B2 | * | 5/2015 | Lava | E06B 9/326 160/321 |
| 9,062,492 B2 | * | 6/2015 | Yu | E06B 9/322 |
| 9,328,547 B2 | * | 5/2016 | Daus | B66D 1/02 |
| 9,797,191 B2 | * | 10/2017 | Huang | E06B 9/322 |
| 9,890,588 B2 | * | 2/2018 | Smith | E06B 9/50 |
| 2006/0068962 A1 | * | 3/2006 | Allsopp | E06B 9/42 475/182 |
| 2006/0108076 A1 | * | 5/2006 | Huang | E06B 9/307 160/176.1 R |
| 2009/0008046 A1 | * | 1/2009 | Roetgering | E06B 9/322 160/321 |
| 2017/0191310 A1 | * | 7/2017 | Huang | E06B 9/262 |
| 2017/0218697 A1 | * | 8/2017 | Chen | E06B 9/34 |
| 2017/0241198 A1 | * | 8/2017 | McNeill | E05F 11/32 |
| 2018/0291684 A1 | * | 10/2018 | Berman | E06B 9/326 |
| 2018/0298683 A1 | * | 10/2018 | Huang | E06B 9/322 |

* cited by examiner

DUAL CORD OPERATING SYSTEM FOR AN ARCHITECTURAL COVERING

CROSS REFERENCE TO RELATED APPLICATIONS

This application claims the benefit of priority under 35 USC § 119(e) of the earlier filing date of U.S. Provisional Patent Application No. 62/297,770 filed 19 Feb. 2016 and entitled "Dual Cord Operating System for Controlling a Covering for an Architectural Opening," which is hereby incorporated by reference in its entirety.

FIELD

This disclosure relates generally to architectural coverings, and more specifically to a dual cord operating system for controlling an architectural covering.

BACKGROUND

Some architectural coverings utilize a cord to extend and to retract the covering material in a horizontal direction, and are generally referenced as vertical coverings, or vertical window coverings, or vertical blinds (referenced herein by any such term without intent to limit). Some vertical window coverings utilize two cord loops for operation: one control cord loop for actuation by the user and a second control cord loop, connected to the first for extending and retracting the vanes in response to the user's pulling on the first control cord loop. Often the first cord loop is pre-tensioned, which in turn increases the amount of pull force needed to move the covering. A two cord configuration reduces the length of cord that must be under tension, and allows for better control of the tension of the cord that is actuated by the user. Additionally, a hand wand often is used to further control the amount of light passing through the covering material, such as, in the case of vertical blinds, by rotating the position of the vanes. Such hand wand may also provide a guide for the first cord. However, the integration of the wand into the housing and the tension of the cords often cause the wand to pull or "kick" away from vertical alignment.

SUMMARY

The present disclosure provides an operating system for vertical coverings, such as vertical blinds, that addresses the issues identified above as well as other issues presented by present designs. The present disclosure generally provides a dual cord operating system for an architectural covering, such as coverings for an architectural structures or features, such as windows, doorways, archways, and the like. As provided below, the operating system improves control of a covering by operably coupling a head rail cord loop with a separately configured control cord loop. The two cord loops may be coupled to provide mechanical advantage and reduced pull force for a user compared to systems in which the head rail cord and the control cord are coupled without a mechanical advantage. The operating system maintains the control cord loop in a configuration which reduces the possibility of entanglements (such as in a position adjacent an operation touch point, such as an operating wand) while maintaining an acceptable pull force needed to drive the head rail cord loop. A further understanding of the nature and advantages of the present disclosure may be realized by reference to the remaining portions of the specification and drawings.

The present disclosure is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of embodiments, it should be appreciated that individual aspects of any embodiment can have individual utility or be incorporated into other embodiments and further can be claimed separately or in combination with aspects and features of that embodiment or any other embodiment.

The present disclosure is set forth in various levels of detail in this application and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. It should be understood that the claimed subject matter is not necessarily limited to the particular embodiments or arrangements illustrated herein.

BRIEF DESCRIPTION OF THE DRAWINGS

The accompanying drawings, which are incorporated into and constitute a part of the specification, illustrate examples of the disclosure and, together with the general description given above and the detailed description give below, serve to explain the principles of these examples.

DETAILED DESCRIPTION

Figure 1:
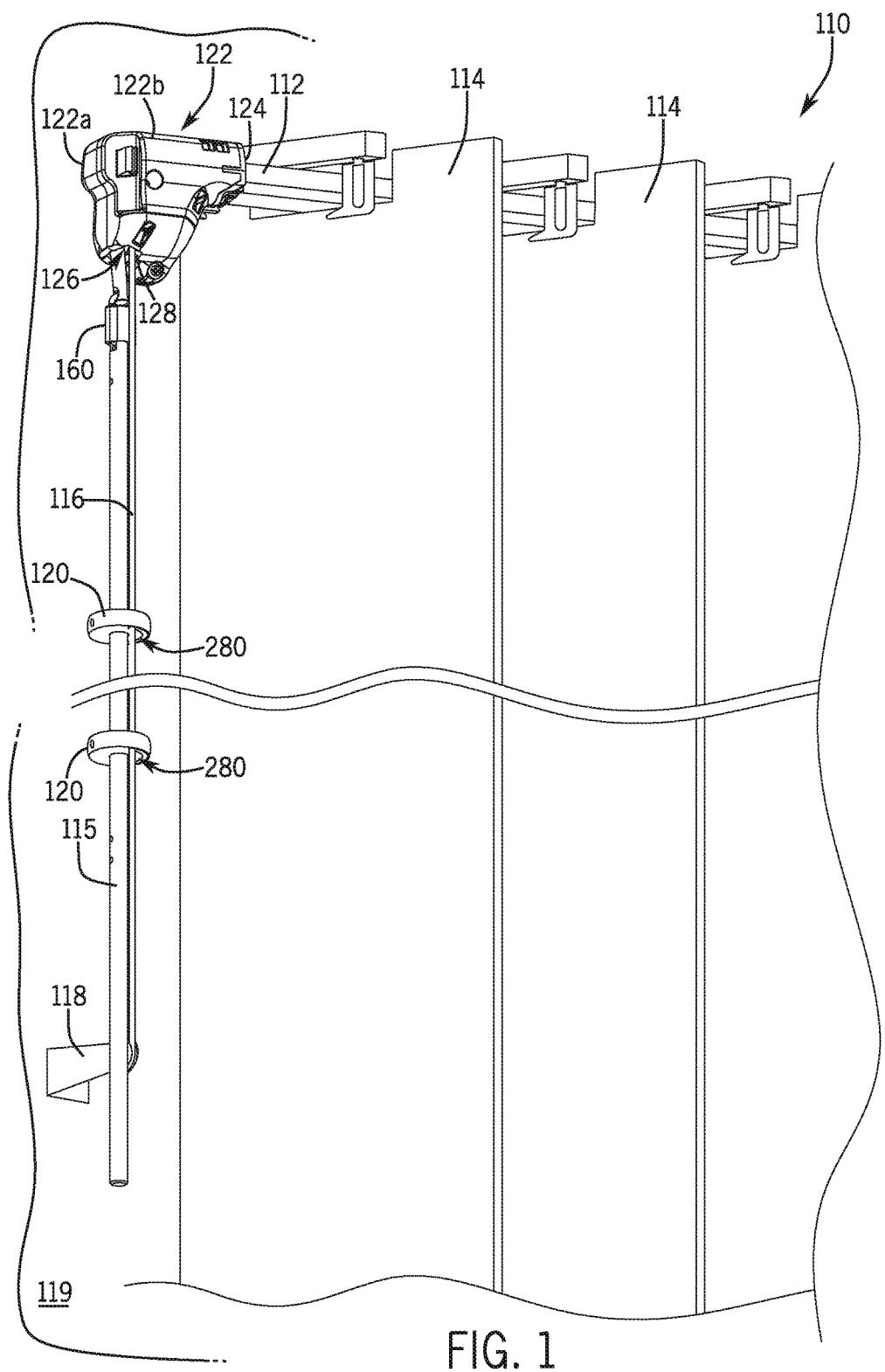
FIG. 1 is a fragmentary isometric view of a retractable covering incorporating a dual cord operating system in accordance with some embodiments of the present disclosure. The covering is shown in an extended and open configuration in accordance with some embodiments of the present disclosure.
Figure 2:
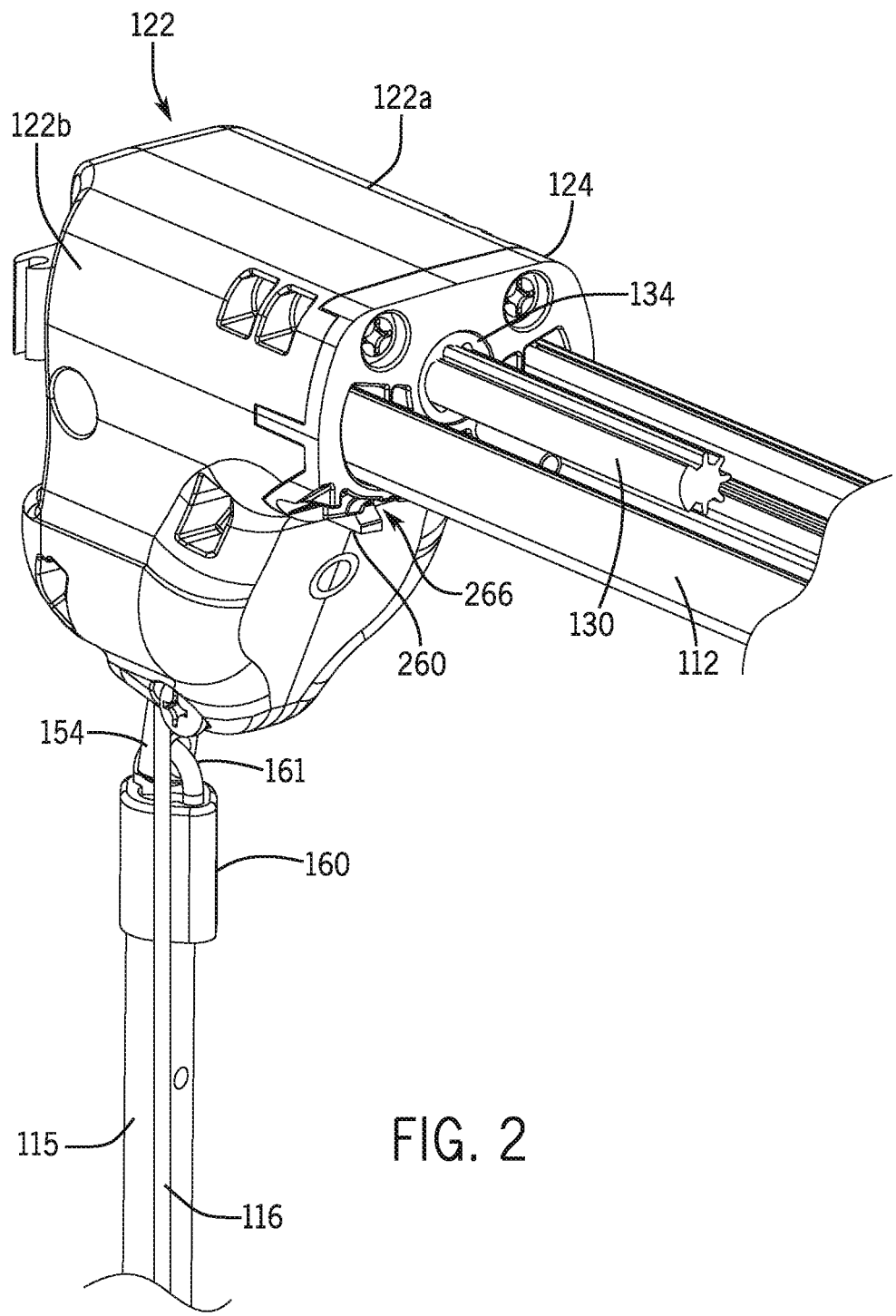
FIG. 2 is a fragmentary isometric view of the covering of FIG. 1 with the covering removed for clarity in accordance with some embodiments of the present disclosure.

The present disclosure generally provides an operating system for an architectural covering, such as coverings for an architectural structure or feature, such as windows, doorways, archways, or the like (hereinafter "architectural structure/feature" for the sake of simplicity and without intent to limit). The operating system may include a first drive assembly operable to move the architectural covering in a first manner, such as between an extended configuration in which the covering is at least partially extended across the architectural structure/feature, and a retracted configuration in which the covering is at least partially retracted across the architectural structure/feature. The first drive assembly may be rotatably mounted within a housing. Optionally, the housing is compact and positioned or mounted adjacent to, and optionally coupled to, a head rail so as not to be in the path of the covering material. The first drive assembly may provide a transmission or transmission system between (e.g., coupling) a first cord loop operated by a user and a second cord loop operable to move the covering in a first manner, such as between the extended configuration and the retracted configuration.

The operating system may also include a second drive assembly operable to move the covering in a second manner, such as between a closed configuration and an open configuration to vary the amount of light passing through the covering material. The second drive assembly may include a separate touch point or control element, such as a rotatable operating shaft or wand (hereinafter referred to as an operating wand without intent to limit), arranged to move the architectural covering between the closed and open configurations. The second drive assembly may be separate from but operationally engaged with the first drive assembly. The second drive assembly may be proximate the first drive assembly. The first drive assembly may include a cord loop aligned with an operating element of the second drive assembly. For example, the first cord loop may be maintained in proximity to, such as in an overlapping relationship with, the operating wand of the second drive assembly. As such, tension on the first cord loop has a minimal effect on the position of the operating wand (e.g., the hang of the wand) associated with the second drive assembly. The use of two cord loops in the first drive assembly may serve to shorten the overall length of cord used to operate extension and retraction of the covering (i.e., by having two loops, each shorter than prior cord loops). The first drive assembly may be configured to decouple effects of tension of the second cord loop from the operating wand of the second drive assembly via the first cord loop (e.g., so that tension on the second cord loop is not translated to the operating wand of the second drive assembly and thereby does not interfere with or alter the position of the operating wand of the second drive assembly).

The first cord loop may be coupled to an input side of the first drive assembly and the second operating cord may be coupled to an output side of the first drive assembly. For example, the first cord loop may be routed around a first pulley of the first drive assembly, and the cord loop may be routed around a second pulley of the first drive assembly. In such embodiments, the first and second pulleys may be operatively coupled such that the first drive assembly operatively couples the first cord loop with the second cord loop. In this manner, a user may move the covering between extended and retracted configurations by manipulating the first cord loop, which in turn will actuate the first drive assembly and manipulate the second cord loop to move the covering between extended and retracted configurations. The drive assembly may be configured to provide mechanical advantage to the user so that less force is required to cause the covering to move between extended and retracted positions than required by prior systems.

The operating wand may be coupled with a first operating element of the second drive assembly, the first operating element in turn coupled to (e.g., engaged with) a second operating element of the second drive assembly, such as via a transmission (e.g., a gear assembly or mesh therebetween). In such embodiments, the engagement between the first and second operating elements may provide a gear reduction or mechanical advantage to facilitate moving the covering between the closed and open configurations. The second operating element may be coupled with a shaft in the head rail that moves the covering (e.g., vanes or other types of blind panels) between open and closed configurations (e.g., by rotating the vanes). For example, movement, such as rotation, of the first operating element in a first direction (e.g., rotation counterclockwise) translates through the coupling mechanism between the first and second operating elements to move the second operating element and, correspondingly, the shaft fixed to the second operating element in a first manner, such as causing the second operating element and shaft to rotate in a first rotational direction (e.g., clockwise). Movement of the second operating element (and shaft) in the first manner may move (e.g., rotate) the covering to the open or closed position, such as causing the front of the vanes of the covering to pivot either toward or away from the second drive assembly. Similarly, movement, such as rotation, of the first operating element in a second direction (e.g., rotation clockwise) translates through the coupling mechanism between the first and second operating elements to move the second operating element and the shaft in a second manner, such as causing the second operating element and shaft to rotate in a second rotational direction (e.g., counter-clockwise). Movement of the second operating element (and shaft) in the second manner may move (e.g., rotate) the covering to the open or closed position, such as causing the front of the vanes of the covering to pivot in the opposite direction.

An embodiment of a housing and drive assembly providing various of the aforementioned benefits is illustrated in FIGS. 1-4, 8, and 11-13. As shown in FIGS. 1-4, an example of a retractable covering 110 having a covering material mounted on a head rail 112 extends across an architectural structure/feature. The retractable covering 110 may be mounted to a wall 119 (such as via the head rail 112) defining the architectural structure/feature (e.g., along a top of the structure/feature). In some embodiments, the covering material may include one or more covering panels or vanes 114 suspended from the head rail 112, the vanes 114 including vertically extending longitudinal axes. A first drive assembly 132 for the covering 110 may be used to reversibly translate the covering 110 between extended and retracted configurations such as by moving the vanes 114 along a length of the head rail 112. In an extended configuration, the vanes 114 of the covering are extended at least partially across the architectural structure/feature. In a retracted configuration, the vanes 114 may be retracted adjacent to one side of the architectural structure/feature in a stacked relationship with one another so as to cover none or only a portion of the architectural structure/feature. In some embodiments, the operating system may include a first touch point to operate the first drive assembly 132. For instance, a first operating cord loop 116 may be controlled by a user to actuate the first drive assembly 132 to operate the retractable covering 110, such as by transferring the force of the first operating cord 116 to a second operating cord 146 that loops along the head rail 112. As explained below, the second operating cord 146 may be coupled with the covering 110 (e.g., with the vanes 114) such that movement of the second operating cord 146 moves the covering 110 between extended and retracted configurations.

A second drive assembly 134 for the covering 110 may be used to alter the retractable covering 110 in another manner. For example, the second drive assembly 134 may be used to adjust, such as increasing and/or reducing/eliminating, viewing through the covering 110. In one non-exclusive embodiment, the second drive assembly 134 may pivot the vanes 114 about their longitudinal axes to move the covering 110 between open and closed configurations varying light transmission and view through the covering 110. In an open configuration, the vanes 114 may extend substantially parallel to one another and generally perpendicular to the architectural structure/feature in which the covering 110 is mounted such as to define a space therebetween to allow viewing therethrough. In a closed configuration, the vanes 114 are in a parallel overlapping relationship with one another and substantially parallel with the architectural structure/feature so as to reduce viewing through the covering 110. While the vanes 114 are illustrated as extending vertically, the vanes 114 could also be suspended horizontally as in a Venetian-type blind whereby ends of the vanes 114 opposite the rail 112 would be pivotably attached to a support element. In the embodiments described herein, the vanes 114 may form a shade or blind. In some embodiments, the operating system may include a second touch point to operate the second drive assembly 134. For example, in one embodiment, an operating wand 115 may be rotated by a user about its longitudinal axis to actuate the second drive assembly 134, which may move the vanes 114 and hence the covering 110 between open and closed configurations, as described more fully below.

According to various aspects of the present disclosure, the first drive assembly 132 is positioned relative to the second drive assembly 134 to provide a desired aesthetic and/or functional characteristic. For example, the first drive assembly 132 may be proximate the second drive assembly 134. In one embodiment, the first drive assembly 132 may include an operating element aligned with an operating element of the second drive assembly 134. For instance, the first operating cord 116 may be aligned with, such as overlapping, an operating element of the second drive assembly 134. In further example, the first operating cord 116 may extend around the operating wand 115 for operational movement about the operating wand 115. As described below, the first operating cord 116 may be held in place and movable with respect to the operating wand 115, such as via a tether that is rotatably mounted to the operating wand 115.

A housing 122 may be coupled to, such as mounted on, one end of the head rail 112 for mounting and optional enclosure of the operating system, particularly for optional enclosure of the first drive assembly 132 and the second drive assembly 134. In an embodiment in which the housing 122 is mounted on an end of the head rail 112, the housing 122 may be mounted such that at least the first drive assembly 132 is sufficiently above the covering material so as not to interfere with extension and retraction of the covering 110. Such a configuration may advantageously be used to provide a desired aesthetic and/or functional characteristic, such as reducing or eliminating the need to cut out portions of the vanes 114 to accommodate the housing 122.

The first operating cord 116, which may be referred to as a cord loop or a control cord, and may be considered the first cord loop, extends downward from at least a portion of the first drive assembly 132, such as from within the housing 122, and adjacent the operating wand 115. The first operating cord 116 may be coupled to the first drive assembly 132 to allow the user to manually operate the first drive assembly 132. Circulation of the first operating cord 116 actuates the first drive assembly 132 and causes the second operating cord 146 to translate the vanes 114 along a length of the head rail 112 and across the architectural structure/feature so as to move the covering 110 between extended and retracted configurations. Optionally, a lower end of the first operating cord 116 may pass around a cord anchor 118, which may, in turn, be secured to a frame or wall 119 defining the architectural structure/feature. In some embodiments, the first operating cord 116 may descend from the head rail 112 in a closed loop, and may be pre-tensioned, for example, against the operating wand 115, in order to achieve compliance with child safety standards. In certain embodiments, the first operating cord 116 may extend along the operating wand 115 for operational movement about the operating wand 115 and may be held in place and rotatable with respect to the operating wand 115. For example, the first operating cord 116 may pass through a curved channel defined within a handle (not shown) of the operating wand 115, or around a pulley housed within a handle (not shown) of the operating wand 115, or through any other sort of tether attached to the operating wand 115 rather than a fixed anchor on the wall 119. In each exemplary embodiment, the cord anchor 118 or curved channel or pulley within a handle provides for circulation and change of direction of the closed loop of the first operating cord 116, allowing the first operating cord 116 to follow a reversible looped path.

In some embodiments, one or more cord restraints 120 or guides may be coupled to the operating wand 115 and may be operable to maintain the first operating cord 116 in close adjacent relationship with the operating wand 115 and allow the first operating cord 116 to reversibly move up and down along the length of the operating wand 115 (see FIG. 1). An arcuate slot 280 or other opening may be defined in the cord restraints 120 through which opposing sections of the first operating cord 116 pass. Depending on the length of the operating wand 115 and the first operating cord 116, one or more cord restraints 120 may be coupled to the operating wand 115 in fixed configurations at regular or irregular spaced intervals. The operating wand 115 may be releasably coupled to the operating system so that each cord restraint 120 may slide over the top of the operating wand 115 and along the length of the operating wand 115 until the desired position of each cord restraint 120 is found. Each cord restraint 120 may be fastened or secured to the operating wand 115 at particular locations along the operating wand 115.

In accordance with one aspect of the disclosed first drive assembly 132, the first operating cord 116 may extend from the first drive assembly 132 to be positioned closer to an operating element (e.g., a first operating element 154) of the second drive assembly 134 than previously achieved in similar drive assemblies for retractable coverings. Because the first operating cord 116 is closer to the first operating element 154 of the second drive assembly 134 and the wand 115 attached to the first operating element 154, pretension forces on the first drive cord 116 have a shorter moment arm (if any) with respect to the wand 115 and the operating element 154 of the second drive assembly 134, and thus such forces are less likely to cause the wand 115 to be displaced from hanging vertically beneath the operating element 154 of the second drive assembly 134.

As shown in the embodiment of FIGS. 3-7, the first drive assembly 132 (e.g., the rotation axis of the first drive assembly 132) is rotatably mounted at an oblique angle relative to a longitudinal axis of the head rail 112. The first drive assembly 132 may be rotatably mounted by, for example, first and second bearings 138, 140. In one embodiment, the first and second bearings 138, 140 may be rotatably received within corresponding first and second bearing surfaces 142, 144, respectively, of the housing 122. The first operating cord 116 may be associated with the first drive assembly 132 and may extend away from the first drive assembly 132 at least partially along a length of the second drive assembly 134. The second operating cord 146, which may be referred to as a head rail cord or a head rail cord loop, and may be considered a second cord loop, may also be associated with the first drive assembly 132 and may extend away from the first drive assembly 132 at least partially along a length of the head rail 112.

The operating system may be arranged to facilitate smooth operation of the first drive assembly 132 notwithstanding the angled mounting of the first drive assembly 132 relative to the head rail 112. For example, the operating system may include structure operable to smoothly direct the first operating cord 116 and/or the second operating cord 146 through various angles to accommodate the angled mounting of the first drive assembly 132. For example without limitation, as shown in the illustrative embodiment of FIGS. 3 and 4, the covering 110 may include a connection member 124 coupling the housing 122 to the head rail 112, such as being positioned at least partially between the housing 122 and the head rail 112. The connection member 124 may include a pulley cradle 265 (see FIG. 10) and a pair of directional pulleys 152 rotatably or non-rotatably mounted on a pulley shaft 153 retained in the pulley cradle 265 (see FIGS. 3 and 4). The directional pulleys 152 are provided to change the direction of the second operating cord 146 from extension along the head rail 112 to operate with the first drive assembly 132. For example, the directional pulleys 152 may be operable to position first and second portions of the second operating cord 146 substantially parallel to a length of the head rail 112 and substantially parallel to a plane of the first drive assembly 132, respectively.

Figure 3:
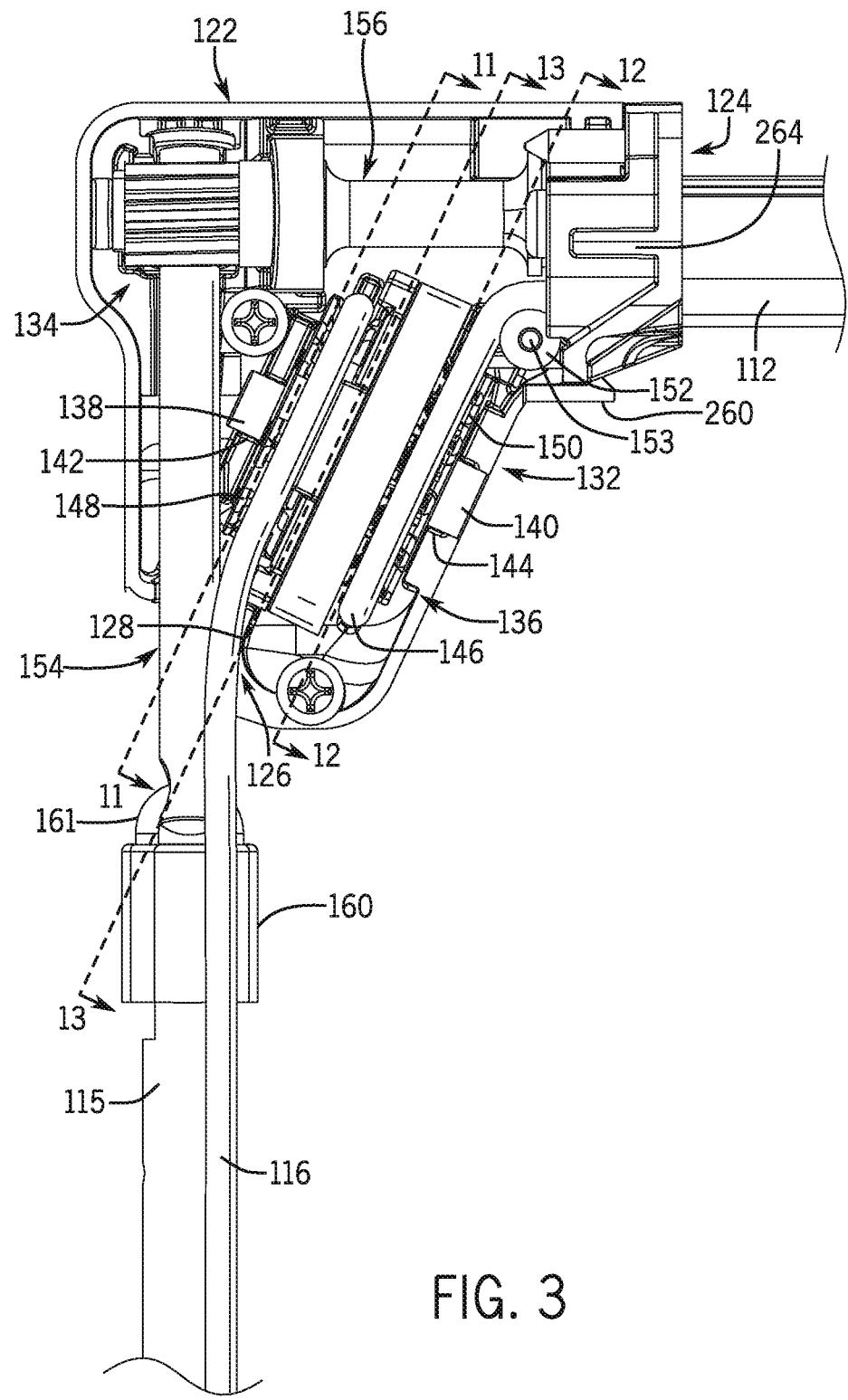
FIG. 3 is an enlarged fragmentary elevation view of the dual cord operating system for the covering of FIG. 1 in accordance with some embodiments of the present disclosure. Half of the housing has been removed for illustration purposes.
Figure 4:
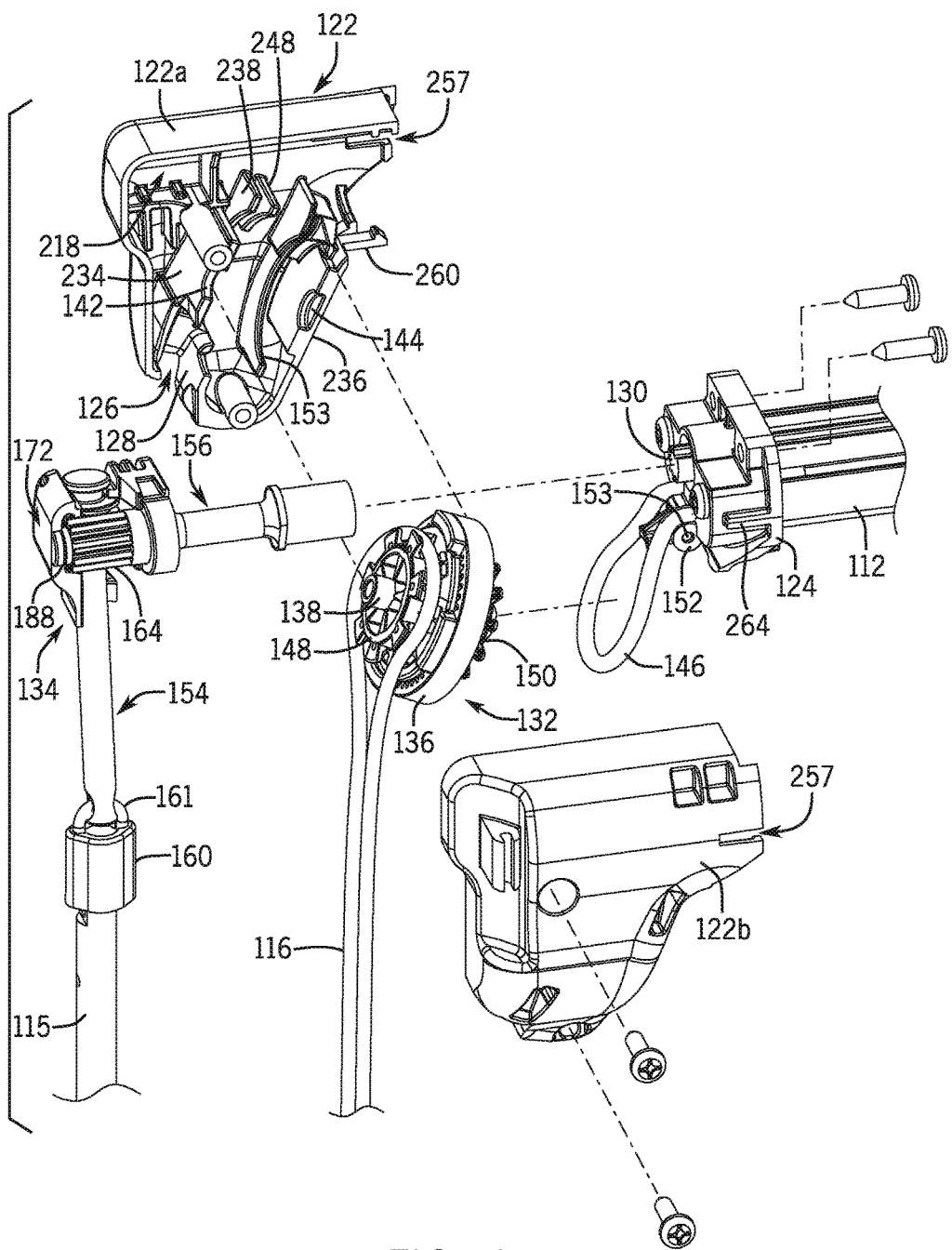
FIG. 4 is an exploded isometric view of the dual cord operating system for the covering of FIG. 1 in accordance with some embodiments of the present disclosure.
Figure 19:
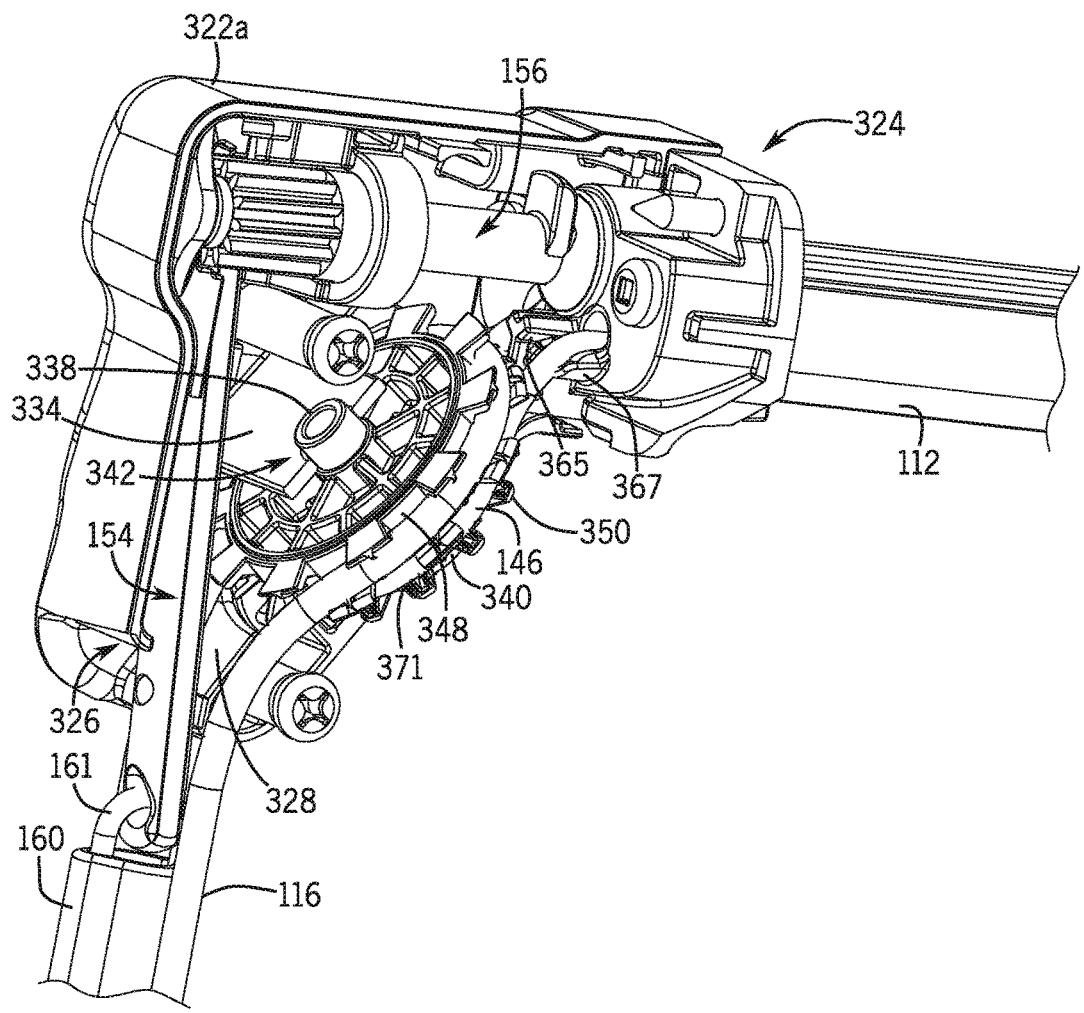
FIG. 19 is a front isometric view of components of a dual cord operating system in accordance with some embodiments of the present disclosure with a front portion of a housing cover removed.
Figure 20:
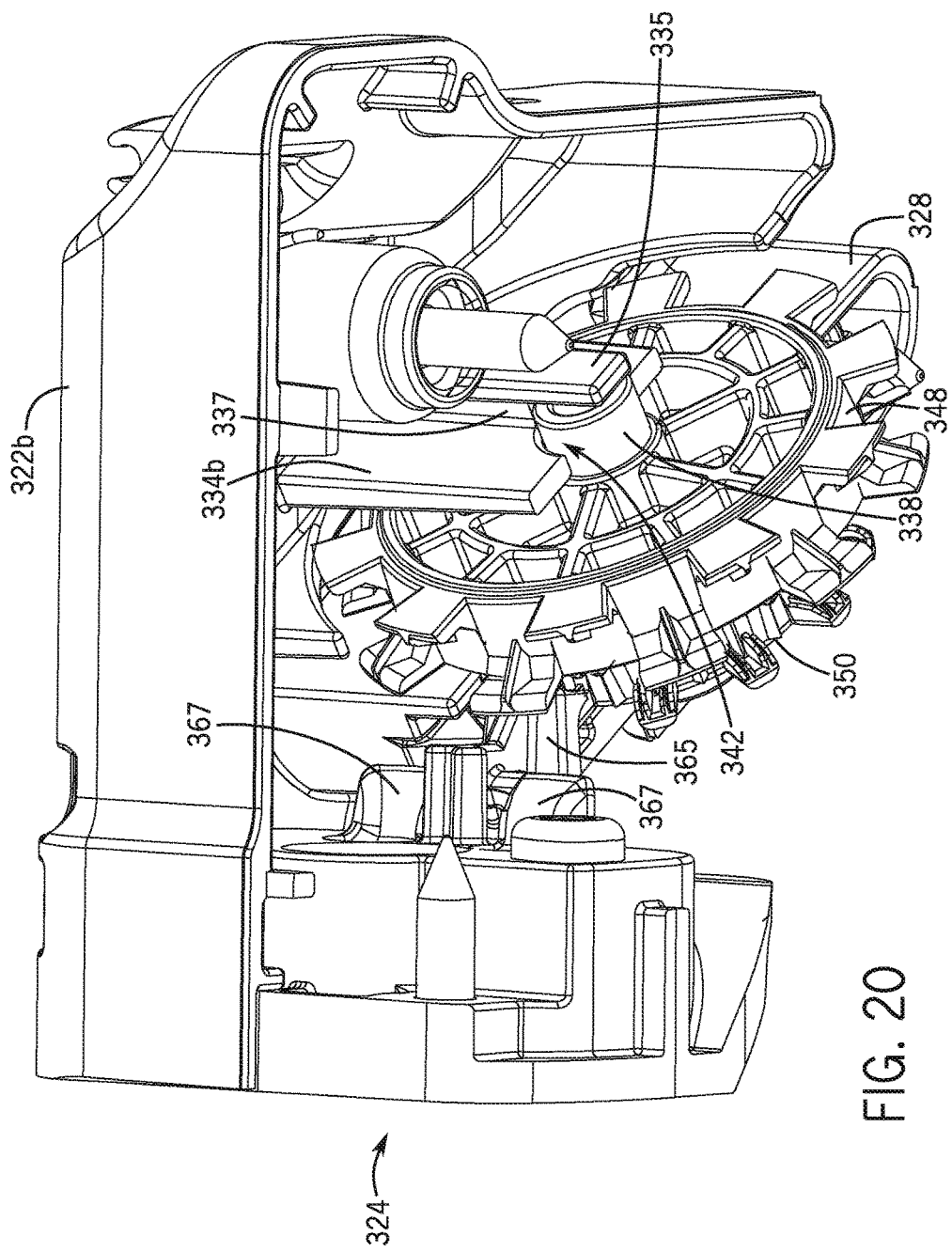
FIG. 20 is a rear isometric view of components of a dual cord operating system in accordance with some embodiments of the present disclosure of FIG. 19 with a rear portion of a housing cover and other elements removed.

In an alternative embodiment as depicted in FIGS. 19 and 20, a pair of cord chutes 367, for example, formed as part of a connection member 324, may extend from a surface of the connection member 324 as a substitute for the directional pulleys 152 of FIGS. 3 and 4. The cord chutes 367 may each form a smooth, concave channel as they extend from the connection member 324. In such embodiments, the two lengths of the second operating cord 146 slide along the cord chutes 367, which extend at an oblique angle with respect to the orientation of the head rail 112 to transition the second operating cord 146 from an orientation substantially parallel to the head rail 112 to an orientation suitable for interfacing with the first drive assembly 132, such as substantially parallel to a plane of the first drive assembly 132.

In some embodiments, the first operating cord 116 may be coupled to a first member of the first drive assembly 132, and the second operating cord 146 may be coupled to a second member of the first drive assembly 132. For example, the first operating cord 116 may be routed around a first pulley 148 of the first drive assembly 132, and the second operating cord 146 may be routed around a second pulley 150 of the first drive assembly 132. In such embodiments, the first pulley 148 and the second pulley 150 are operatively coupled so that the first drive assembly 132 operatively couples the first operating cord 116 with the second operating cord 146. In this manner, a user may move the covering 110 between extended and retracted configurations by manipulating the first operating cord 116, which in turn will actuate the first drive assembly 132 to manipulate the second operating cord 146 to move the covering 110 between extended and retracted configurations.

In some embodiments, the first drive assembly 132 may be arranged to provide a mechanical advantage to reduce the amount of force needed to operate the covering 110, such as reducing the amount of pull force needed to move the covering between extended and retracted positions. In an illustrative embodiment, as shown in FIG. 3, the first drive assembly 132 may include a gear reduction system such as a planetary gear train system 136 or other gear reduction system. The gear ratio(s) of the gear system may be chosen to provide a mechanical advantage to reduce the force required by the user to exert on the first operating cord 116 to cause the second operating cord 146 to move the covering 110 between extended and retracted positions. For example, the planetary gear system 136 may be configured to move the covering 110 between extended and retracted configurations with greater force than that provided by the user. For instance, the planetary gear system 136 may be configured such that the travel speed and translation distance of the second operating cord 146 will be less than the corresponding travel speed and translation distance of the first operating cord 116, but the torque applied to the second operating cord 146 will be greater than the torque applied by the first operating cord 116, as explained below.

Figure 6:
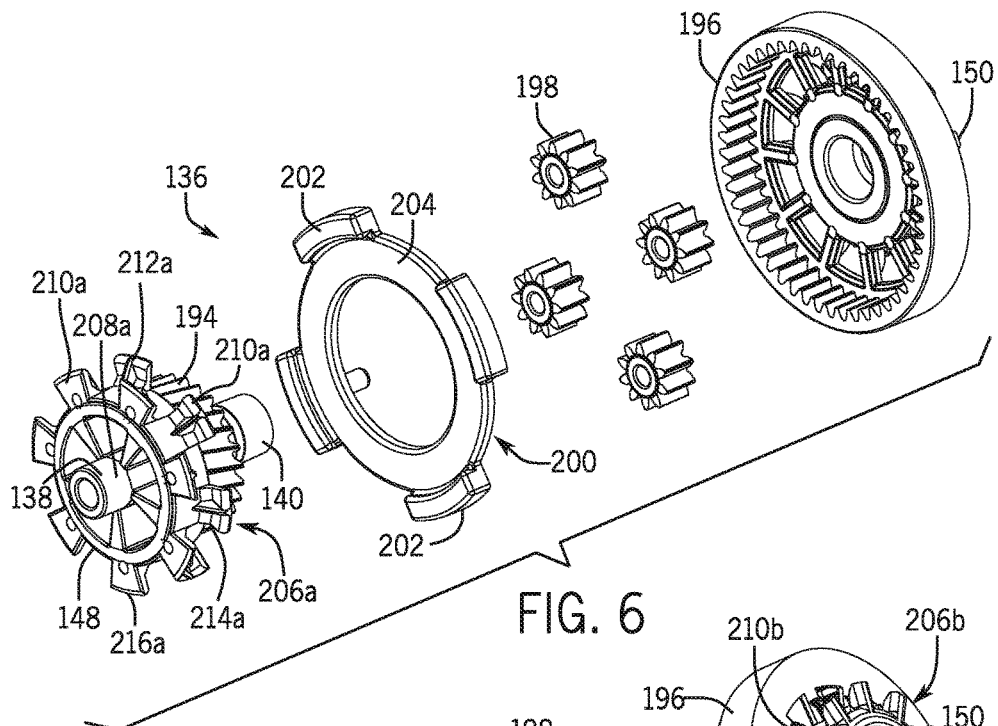
FIG. 6 is an exploded top front isometric view of the gear reduction assembly of FIG. 5 in accordance with some embodiments of the present disclosure.
Figure 7:
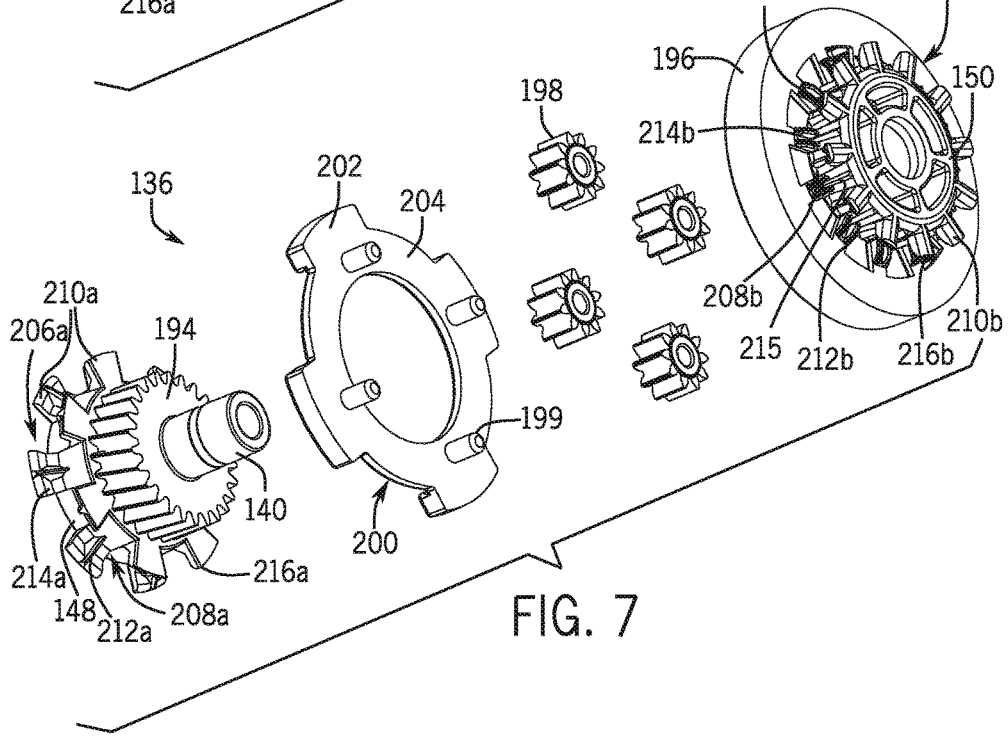
FIG. 7 is an exploded bottom rear isometric view of the gear reduction assembly of FIG. 5 in accordance with some embodiments of the present disclosure.

The planetary gear system 136 may include a sun gear 194, a ring gear 196, and a plurality of planet gears 198 positioned between and interfacing with or interconnecting the sun gear 194 and the ring gear 196 (see FIGS. 6 and 7). A carrier 200 or carriage may support the plurality of planet gears 198 on posts 199 extending from one side of the carrier 200 within the planetary gear system 136. The carrier 200 may include a plurality of buttresses 202 extending radially away from a main body 204 of the carrier 200. As explained in further detail below, the carrier 200 may be a plate, and also may be held in a stationary, non-rotating manner within the housing 122 by, for example, engagement of the plurality of buttresses 202 with portions of the housing 122. As with typical planetary gear systems, the sun gear 194 may include a plurality of gear teeth extending outwardly from a rotational axis of the sun gear 194 and operable to engage a plurality of gear teeth of each of the planet gears 198. The ring gear 196 may include a plurality of gear teeth extending inwardly towards a rotational axis of the ring gear 196 and operable to engage the plurality of gear teeth of each of the planet gears 198.

In some embodiments, the sun gear 194 may include a smaller number of gear teeth than the ring gear 196. In such a design, a greater number of rotations of the sun gear 194 will correspond to a smaller number of rotations of the ring gear 196. As a result, if the first operating cord 116 is coupled with the sun gear 194 and the second operating cord 146 is coupled with the ring gear 196, the travel speed and translation distance of the second operating cord 146 will be less than the corresponding travel speed and translation distance of the first operating cord 116, but the torque applied to the ring gear 196 will be greater than the torque applied to the sun gear 194. Correspondingly, the pulling force exerted on the second operating cord 146 will be greater than the pulling force exerted on the first operating cord 116 by a user.

The rotational axis of the sun gear 194 corresponds with the rotational axis of the ring gear 196, and defines a common rotational axis of the planetary gear system 136. Rotation of the sun gear 194 in a first rotational direction causes the plurality of planet gears 198 to rotate in a second rotational direction opposite the first rotational direction. Rotation of the plurality of planet gears 198 in the second rotational direction causes the ring gear 196 to rotate in the second rotational direction. In a similar manner, rotation of the sun gear 194 in the second rotational direction causes the plurality of planet gears 198 and the ring gear 196 to rotate in the first rotational direction.

As shown in FIGS. 3-7, the illustrated embodiment of a first drive assembly 132 includes a first pulley 148 and a second pulley 150. The first pulley 148, which may be referred to as an input pulley, may be coupled to, such as non-rotatably fixed or attached to or formed as part of, the sun gear 194. In like manner, the second pulley 150, which may be referred to as an output pulley, may be coupled to, such as non-rotatably fixed or attached to or formed as part of, the ring gear 196. In some embodiments, the first pulley 148 may include a first bearing 138, and the second pulley 150 may include a second bearing 140. In some embodiments as shown in the figures, the first pulley 148 may include both the first and second bearings 138, 140. The first operating cord 116 may be operably engaged with the first pulley 148 on the sun gear 194, and the second operating cord 146 may be operably engaged with the second pulley 150 on the ring gear 196. In such embodiments, manipulation of the first operating cord 116 by a user rotates the sun gear 194 of the planetary gear system 136 on the first and second bearings 138, 140, and translates rotation through the planet gears 198 to the ring gear 196 to rotate the ring gear 196 in an opposite direction to drive the second operating cord 146 as explained above.

Figure 5:
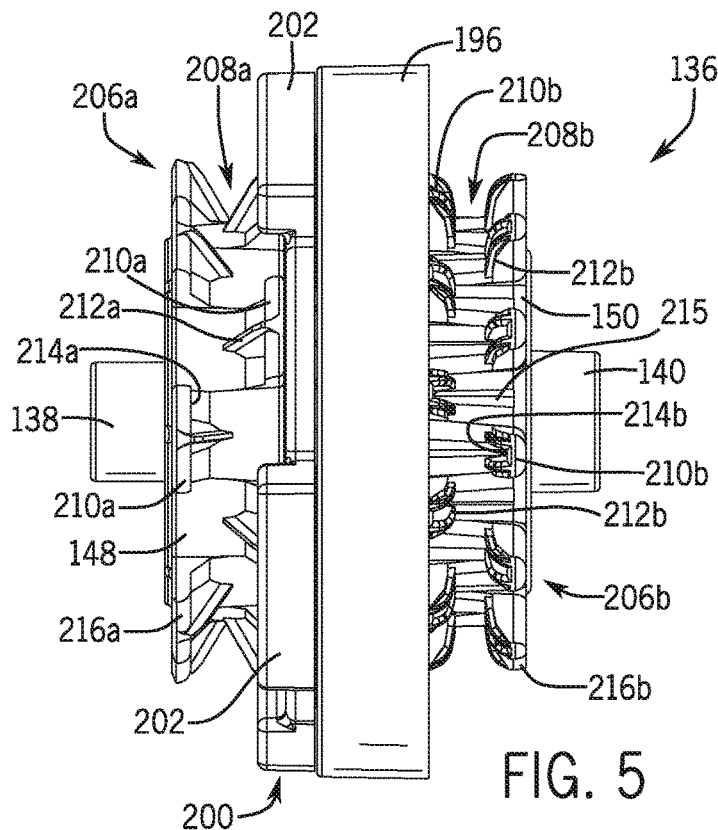
FIG. 5 is an elevation view of a gear reduction assembly of a first drive assembly in accordance with some embodiments of the present disclosure.

Referring to FIGS. 5-7, each of the illustrated embodiments of first and second pulleys 148, 150 includes alternating brackets 206a/b to define respective cord receiving grooves 208a/b, each having a width, to facilitate engagement of the first and second operating cords 116, 146 with the first and second pulleys 148, 150, respectively. For example, the arrangement of the brackets 206a/b may be such that the brackets 206a/b engage the first and second operating cords 116, 146 without slippage, as described below. The brackets 206a/b may oppose each other to define the grooves 208a/b. In one embodiment, each bracket 206a/b may be spaced apart from adjacent brackets 206a/b. In some embodiments, the brackets 206a/b may be staggered or offset such that a bracket 206a/b on one side of a respective groove 208a/b is positioned opposite a space in between two brackets 206a/b on an opposing side of the respective groove 208a/b.

The brackets 206a on the first pulley 148 may include a tab 210a extending radially away from the rotational axis of the first pulley 148. A ridge 212a may extend perpendicularly from and bisect an inner face 214a of each tab 210a. The ridge 212a may slant or taper from a wide base adjacent the rotational axis of the first pulley 148 and narrow as it extend along the inner face 214a to a top edge 216a of the tab 210a. The bases of the ridges 212a may extend across a midpoint of the groove 208a such that they overlap. The brackets 206a may be spaced apart from each other on opposite sides of the groove 208a such that the first operating cord 116 fits within the groove 208a and is frictionally engaged by the ridges 212a to reduce or eliminate slippage in the groove 208a. The top edges 216b of the tabs 210a and ridges 212a may be rounded or contoured in order to reduce abrasion of the first operating cord 116 as it passes between the brackets 206a.

The brackets 206b on the second pulley 150 may define a tab 210b extending radially away from the rotational axis of the second pulley 150. A pair of ridges 212b may extend perpendicularly from lateral edges of each tab 210b. The ridges 212b on each tab 210b may define a channel between them and the inner face 214b of each tab 210b. A plurality of base ridges 215 may extend along a sidewall of the second pulley 150 from the inner faces 214b between each pair of ridges 212b in a direction substantially parallel to the rotational axis of the second pulley 150. The tabs 210b and ridges 212b may be rounded or contoured at a top edge 216b in order to reduce abrasion of the second operating cord 146 as it passes between the brackets 206b. The brackets 206b may be spaced apart from each other on opposite sides of the groove 208b such that the second operating cord 146 fits within the groove 208b and is frictionally engaged by the ridges 212b and base ridges 215 to reduce or eliminate slippage in the groove 208b.

In another illustrative embodiment depicted in FIGS. 16-20, an alternative first drive assembly 332 has a first pulley 348 and a second pulley 350 that are operatively coupled so that the first drive assembly 332 operatively couples the first operating cord 116 with the second operating cord 146. In one embodiment, the first pulley 348 and the second pulley 350 are axially aligned and rotate together in the same direction, preferably at the same speed. For example, the first operating cord 116 may extend at least partially around the first pulley 348, and the second operating cord 146 may extend at least partially around the second pulley 350. The first pulley 348 is actuated by the user pulling on the first operating cord 116. The second pulley 350 is caused to rotate in conjunction with the first pulley 348 due to the connection therebetween, which causes the second operating cord 146 to extend or to retract the covering 110. An outer diameter of the first pulley 348 may be larger than an outer diameter of the second pulley 350 to provide a mechanical advantage that reduces the pull force required by the user to exert on the first operating cord 116. In this manner, a user may move the covering 110 between extended and retracted configurations by manipulating the first operating cord 116, which in turn will actuate the first drive assembly 332 to manipulate the second operating cord 146 to move the covering 110 between extended and retracted configurations.

The first pulley 348 and the second pulley 350 of the alternative first drive assembly 332 of FIGS. 16-20 may have features similar to features depicted in the embodiment of FIGS. 5-7. For example, the first pulley 348 may include a first bearing shaft 338 extending axially from a first side thereof and a second bearing shaft 340 extending axially from a second side thereof. The second bearing shaft 340 may extend through an axial bearing hole 339 defined in the second pulley 350 when the first pulley 348 and the second pulley 350 are coupled together. The second bearing shaft 140 may extend axially beyond the outer face of the second pulley 350.

Figure 16:
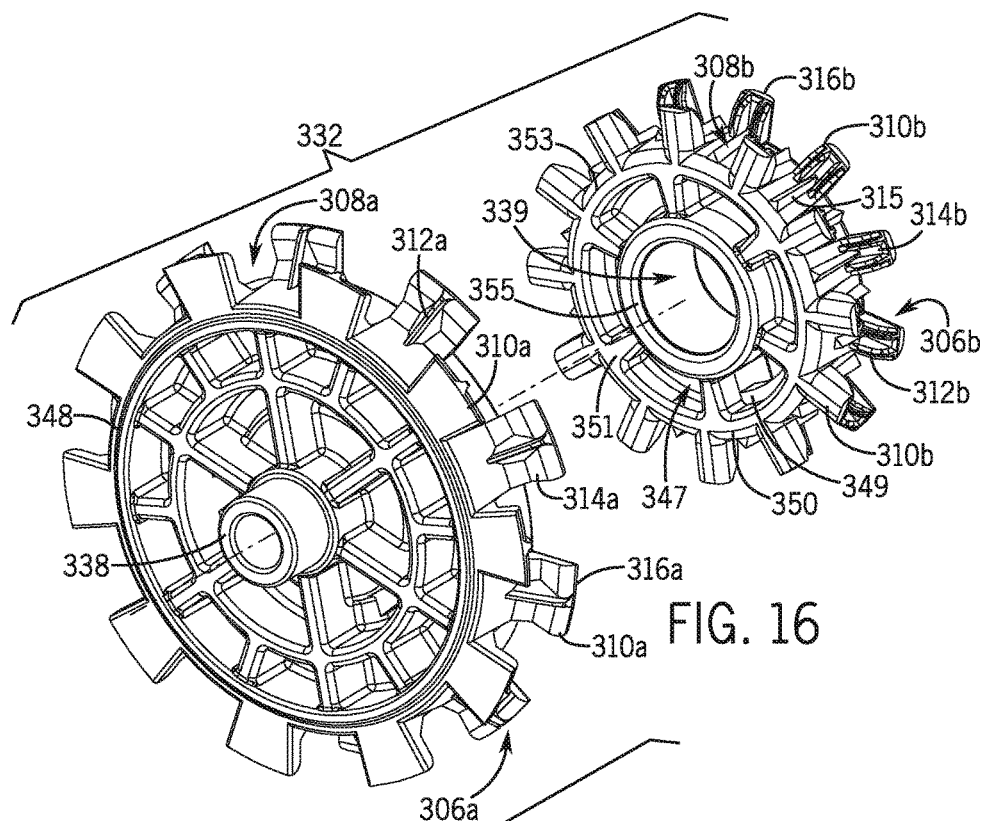
FIG. 16 is an exploded top front isometric view of a pulley assembly in accordance with some embodiments of the present disclosure.
Figure 17:
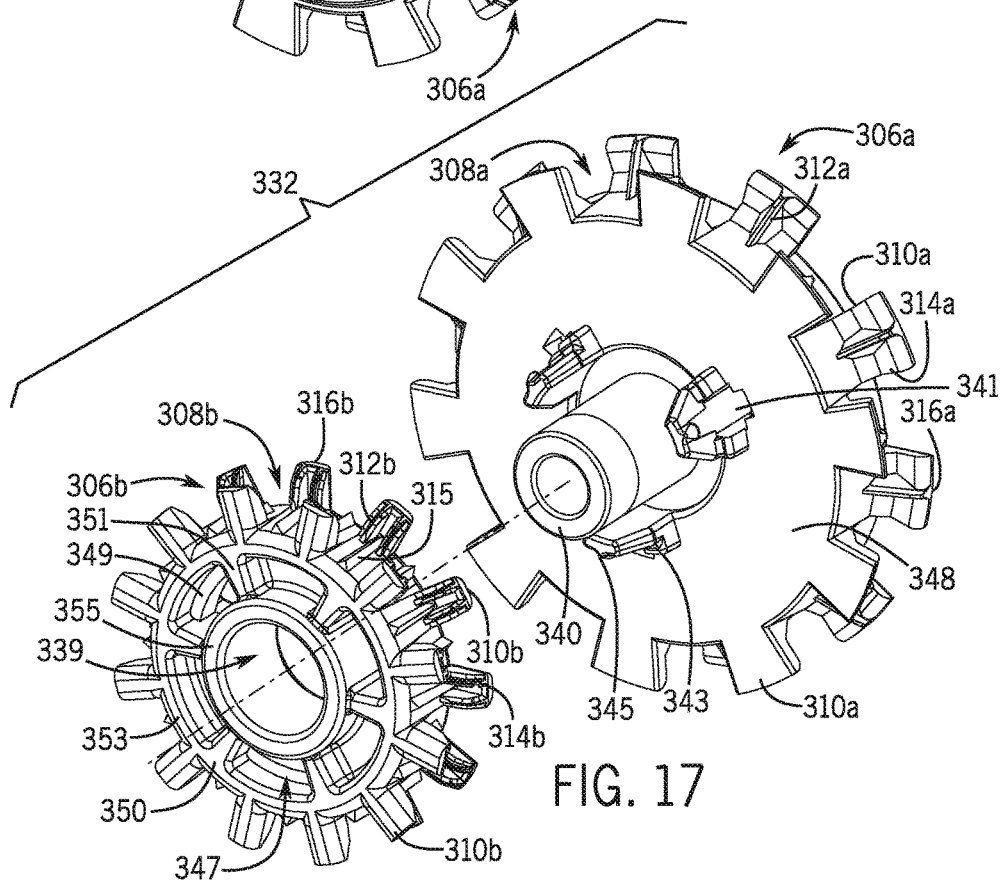
FIG. 17 is an exploded top rear isometric view of the pulley assembly of FIG. 16 in accordance with some embodiments of the present disclosure.
Figure 18:
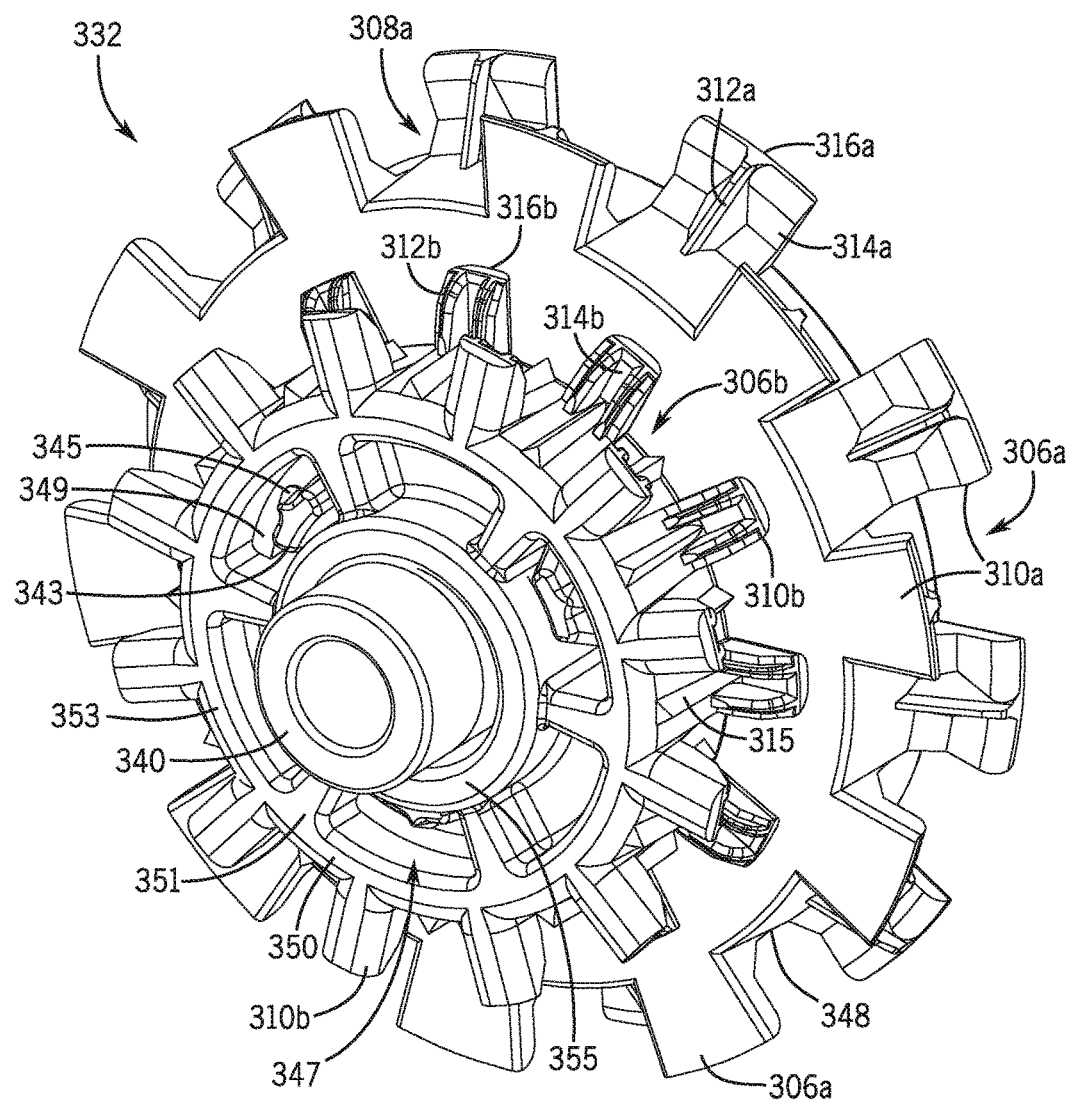
FIG. 18 is an isometric view of the pulley assembly of FIG. 16 in accordance with some embodiments of the present disclosure.

As shown in FIGS. 16-18, the first and second pulleys 348, 350 may each include alternating brackets 306a/b which define respective cord receiving grooves 308a/b, each having a width, to facilitate receipt of the first and second operating cords 116, 146 therein, respectively. The respective brackets 306a/b may oppose each other to define the grooves 308a/b and may be staggered such that a respective bracket 306a/b on one side of a respective groove 308a/b is positioned opposite a space in between two respective brackets 306a/b on an opposing side of the respective groove 308a/b.

Each of the brackets 306a on the first pulley 348 may include a tab 310a extending radially away from the common rotational axis of the alternative first drive assembly 332. A ridge 312a may extend perpendicularly from and bisect an inner face 314a of each tab 310a. The ridge 312a may slant or taper from a wide base adjacent the rotational axis of the first pulley 348 and narrow as it extends along the inner face 314a to a top edge 316a of the tab 310a. The bases of the ridges 312a may extend across a midpoint of the groove 308a such that they overlap. The respective brackets 306a may be spaced apart from each other on opposite sides of the groove 308a such that the first operating cord 116 fits within the groove 308a and is frictionally engaged by the ridges 312a to reduce or eliminate slippage in the groove 308a. The top edges 316b of the tabs 310a and ridges 312a may be rounded or contoured in order to reduce abrasion of the first operating cord 116 as it passes between respective brackets 306a.

Each of the brackets 306b on the second pulley 350 may define a tab 310b extending radially away from the common rotational axis of the alternative first drive assembly 332. A pair of ridges 312b may extend perpendicularly from lateral edges of each tab 310b. The ridges 312b on each tab 310b may define a channel between them and the inner face 314b of each tab 310b. A plurality of base ridges 315 may extend along a sidewall of the second pulley 350 from the inner faces 314b between each pair of ridges 312b in a direction parallel to the common rotational axis of the alternative first drive assembly 332. The tabs 310b and ridges 312b may be rounded or contoured at a top edge 316b in order to reduce abrasion of the second operating cord 146 as it passes between the brackets 306b. The respective brackets 306b may be spaced apart from each other on opposite sides of the groove 308b such that the second operating cord 146 fits within the groove 308b and is frictionally engaged by the ridges 312b and base ridges 315 to reduce or eliminate slippage in the groove 308b.

The first pulley 348 and the second pulley 350 are coupled together to prevent relative rotation therebetween. For example, the first and second pulleys 348, 350 may include corresponding structure operable to limit rotation of the first pulley 348 relative to the second pulley 350. In one embodiment, the second bearing shaft 340 extends through the axial bearing hole 339 defined in the second pulley 350. A plurality of locking tabs 341 may extend outward from a face of the first pulley 348 adjacent to and spaced apart from each other circumferentially around the second bearing shaft 340. Each locking tab 341 may define a seat 343 near a base of the locking tab 341 and a latch nubbin 345 at a distal end of the locking tab 341 extending radially outward therefrom. The locking tabs 341 are sized and spaced to fit within several hub apertures 347 defined between adjacent spokes 351, a rim wall 353, and a hub wall 355 forming part of the structure of the second pulley 350. The hub apertures 347 configured to receive the locking tabs 341 may include a latch shelf 349 extending radially inward from the rim wall 353 toward the hub wall 355. When the first pulley 348 and the second pulley 350 are coupled together, the locking tabs 341 extend within the hub apertures 347 such that the latch nubbins 345 snap past and engage against an outer side of the latch shelves 349, thereby retaining the first pulley 348 and the second pulley 350 together. The seat 343 near the base of each of the locking tabs 341 abuts against an edge surface of the rim wall 353 opposite the second pulley 350 to provide axial tension for engagement of the latch nubbins 345 against the latch shelves 349 and further to provide a small separation distance between the first pulley 348 and the second pulley 350 when the two are attached together. The interface between the latch tabs 349 and the spokes 351 further prevents relative rotation between the first pulley 348 and the second pulley 350 so that they are rotationally fixed together.

As shown in FIGS. 1-4 and 8-10, the housing 122 may be mounted with respect to one end of the head rail 112 via a connection member 124. In some embodiments, the housing 122 may extend from an end of the head rail 112. The housing 122 may define a slot or aperture 126 in a lower surface through which the operating element 154 of the second drive assembly and the first operating cord 116 may enter and/or exit the housing 122. As shown, the aperture 126 may be defined at least partially by an engagement surface 128. The engagement surface may extend at an angle relative to the longitudinal axis of the operating wand 115 and operating element 154 to aid in the transition of the first operating cord 116 from engagement with the first pulley 148 to a position substantially aligned with the operating wand 115. An upper portion of the first operating cord 116 may slide against the engagement surface 128 as the first operating cord 116 is reversibly circulated through the aperture 126. In some embodiments, the lower portion of the first operating cord 116 may extend substantially parallel to the longitudinal axis of the operating wand 115. The engagement surface 128 may be formed to position a lower portion of the first operating cord 116 closely adjacent the operating wand 115 so as to prevent "wand kick" in embodiments in which the first operating cord 116 is corralled by the operating wand 115.

An example of a housing 122, which may be used to house and optionally also to support the above-described first drive assembly 132 and second drive assembly 134, is illustrated in FIGS. 1-4, 8, and 11-13. As shown in FIG. 4, the housing 122 may be a two-piece housing including a first housing half 122a and a second housing half 122b. An interior structure of the first housing half 122a is also shown in FIG. 7 and the interior structure of the second housing half 122b may be substantially a mirror image with some variations to that of the first housing half 122a as will be further described below. The first housing half 122a and the second housing half 122b may be coupled together by mechanical fasteners, adhesive, heat or sonic welding, or any other attachment means. Each of the first and second housing halves 122a, 122b may include corresponding first and second bearing surfaces 142, 144 that rotatably receive the first and second bearings 138, 140, respectively, of the first drive assembly 132. When the first and second housing halves 122a, 122b are coupled together as shown in FIG. 3, the corresponding first and second bearing surfaces 142, 144 of the first and second housing halves 122a, 122b may substantially surround the first and second bearings 138, 140, respectively, to rotatably support the first drive assembly 132 within the housing 122. The first bearing surface 142 that supports the first bearing 138 may be defined by an inner wall 234 formed at an intersection of the first and second housing halves 122a, 122b, and the second bearing surface 144 that supports the second bearing 140 may be defined within an outer wall 236 formed at an intersection of the first and second housing halves 122a, 122b.

In some embodiments, the inner wall 234 and the outer wall 236 may extend at an oblique angle (for example, 45°) relative to a longitudinal axis of the head rail 112. In this manner, the rotational axis of the first drive assembly 132 as held between the first and second bearing surfaces 142, 144 may be oriented at an oblique angle with respect to both a longitudinal axis of the head rail 112 and the longitudinal axis of the operating wand 115. This angular orientation provides an intermediate position for transition of both the first operating cord 116 and the second operating cord 146 to the first drive assembly 132, such as to coaxial pulleys 148, 150. For instance, this angular orientation provides a transition of the first operating cord 116 from a vertical orientation along the operating wand 115 to engage with the first drive assembly 132, as well as a transition of the second operating cord 146 from a horizontal orientation along the head rail 112 to also engage with the first drive assembly 132. By orienting the first drive assembly 132 at such an angle, the possibility for binding of the first and second operating cords 116, 146 within the first and second pulleys 148, 150, respectively is reduced. However, the first and second bearing surfaces 142, 144 and thus the first drive assembly 132 need not be oriented at such an angle and can be arranged in other orientations.

Figure 8:
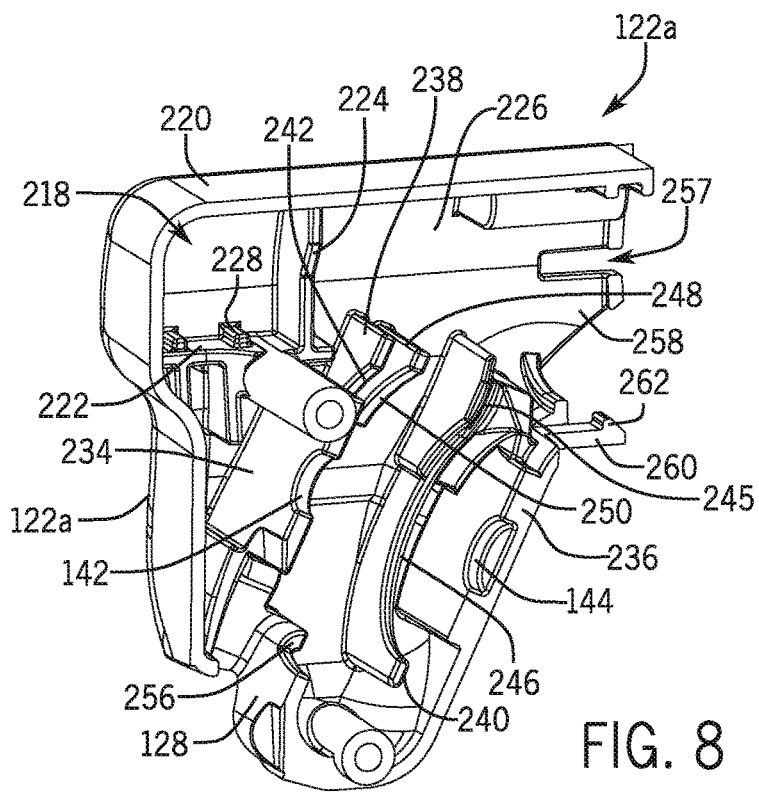
FIG. 8 is an isometric view of a rear housing half in accordance with some embodiments of the present disclosure.

In some embodiments, the housing 122 may be arranged to ensure reliable operation of the first drive assembly 132, such as limiting disengagement of the first and second operating cords 116, 146 from the first drive assembly 132. For example without limitation, each of the first and second housing halves 122a, 122b may include guide structures operable to maintain the first and second operating cords 116, 146 within the grooves 208a, 208b of the first and second pulleys 148, 150, respectively. The first and second housing halves 122a, 122b may together form a first guide structure 238 (see FIG. 11) and a second guide structure 240 (see FIG. 12). As shown in FIG. 8, the first guide structure 238 may be substantially planar plate and may extend inwardly from the inner surface 226 of the first housing half 122a towards the second housing half 122b. An inner edge of the first guide structure 238 may define an arcuate guide surface 242 around an outer diameter of the first pulley 148 (see FIG. 11). The arcuate guide surface 242 is spaced apart from the first pulley 148 to provide sufficient clearance for the first operating cord 116 to pass around the first pulley 148 within the housing 122. The arcuate guide surface 242 assists in seating the first operating cord 116 fully into the groove 208a to achieve full engagement between the first operating cord 116 and the pulley brackets 206a and retain the first operating cord 116 within the groove 208a should the first operating cord 116 "jump" out of the groove 208a during operation. In some embodiments, the arcuate guide surface 242 may not follow a circular arc, but may instead have a varying radius of curvature such that the arcuate guide surface 242 has a smaller radius at a location adjacent the guide pulleys 152 to maintain the first operating cord 116 fully in the groove 208a and a larger radius at a location opposite the guide pulleys 152 to allow the first operating cord 116 to exit the groove 208a and pass out of the housing 122.

Figure 12:
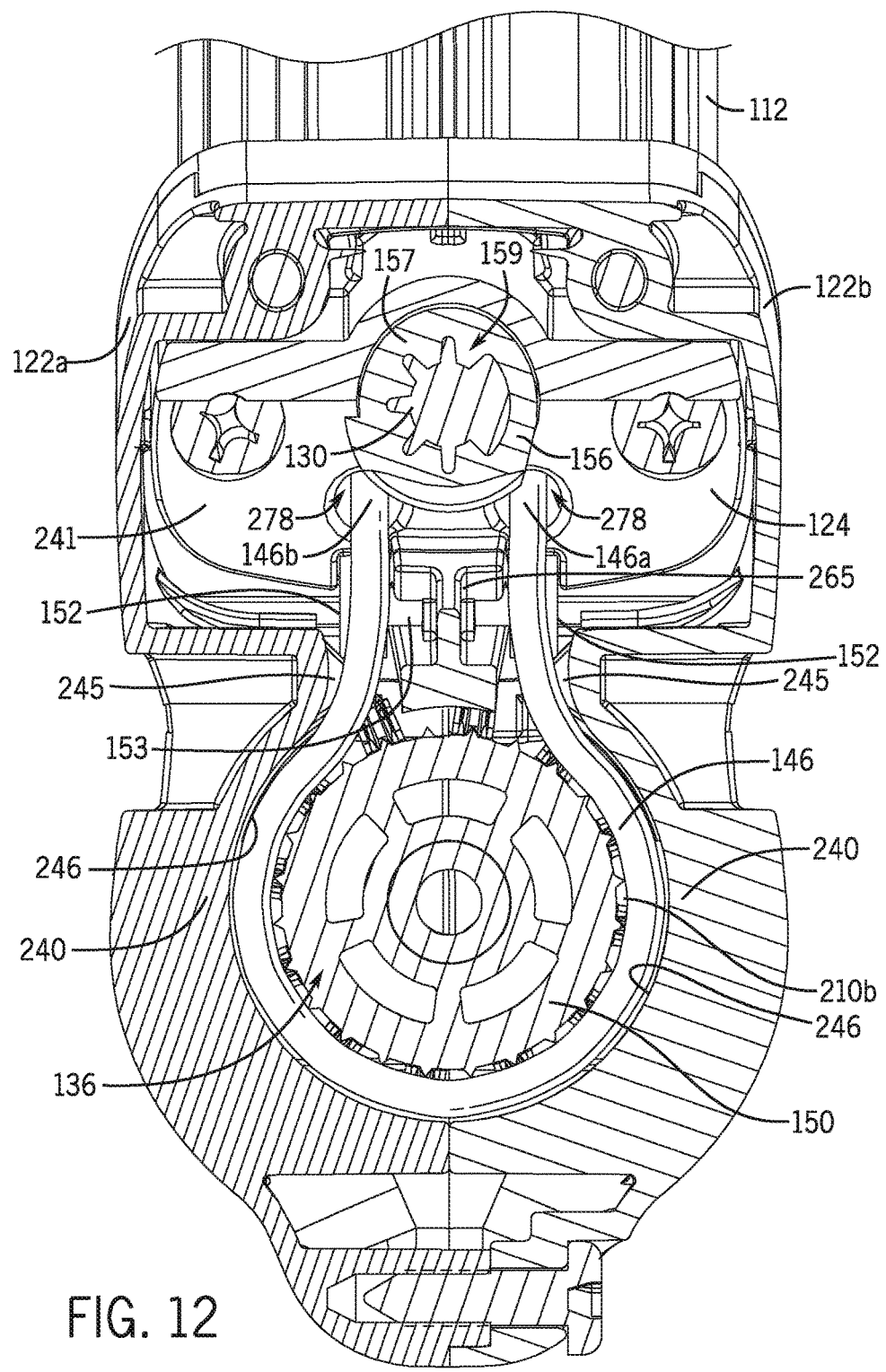
FIG. 12 is a cross-sectional view of the covering of FIG. 1 taken along line 12-12 of FIG. 3 in accordance with some embodiments of the present disclosure.

The second guide structure 240 may be a substantially planar plate and may extend inwardly from the inner surface 226 of the first housing half 122a towards the second housing half 122b. An inner edge surface of the second guide structure 240 may define an arcuate guide surface 246, which may extend around an outer diameter of the second pulley 150 (see FIG. 12). The arcuate guide surface 246 is spaced apart from the second pulley 150 to provide sufficient clearance for the second operating cord 146 to pass around the second pulley 150 within the housing 122. The arcuate guide surface 246 assists in seating the second operating cord 146 fully into the groove 208b to achieve full engagement between the cord and the pulley brackets 206b and retain the second operating cord 146 within the groove 208b should the second operating cord 146 "jump" out of the groove 208b during operation. In some embodiments, the arcuate guide surface 246 may not follow a circular arc, but may instead have a varying radius of curvature such that the arcuate guide surface 246 has a smaller radius at a location opposite the guide pulleys 152 to maintain the second operating cord 146 fully in the groove 208b and a larger radius at a location adjacent the guide pulleys 152 to allow the first operating cord 116 to exit the groove 208b. Further, the arcuate guide surface 246 guides the second operating cord 146 to pass through respective cord apertures 278 in an outer surface 241 of the connection member 124 attached to the housing 122. In this embodiment, the second operating cord 146 slides along a contoured channel 245 at an end of the arcuate guide surface 246 as shown in FIG. 12.

As noted, the second housing half 122b may be similarly configured with corresponding first and second guide structures 238, 240, which are not illustrated. In such embodiments, the arcuate guide surfaces 242, 246 of the first and second housing halves 122a, 122b may at least partially surround the first and second operating cords 116, 146 to reduce or control radial movement of the first and second operating cords 116, 146 away from the first and second pulleys 148, 150, respectively.

Figure 13:
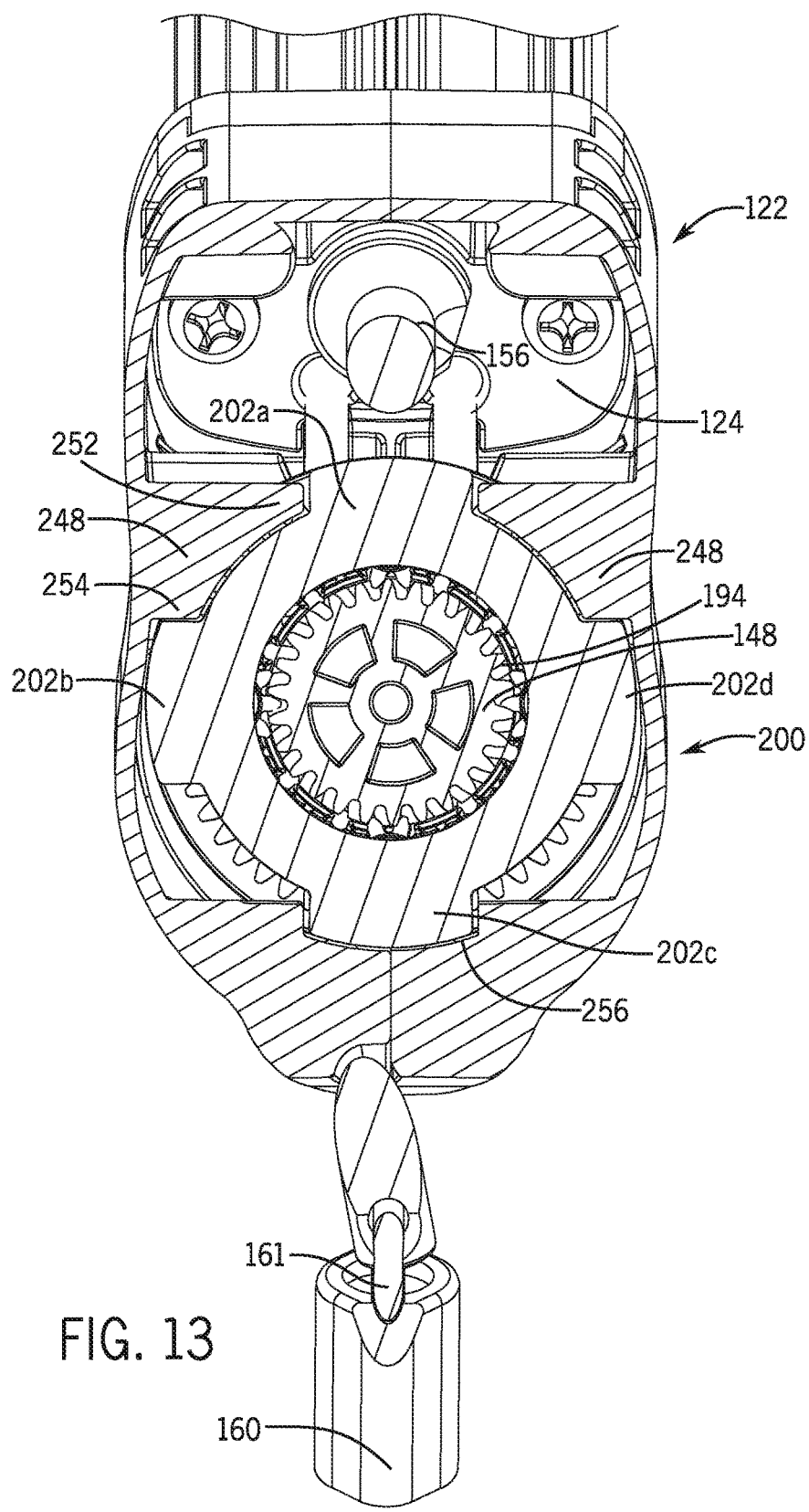
FIG. 13 is a cross-sectional view of the covering of FIG. 1 taken along line 13-13 of FIG. 3 in accordance with some embodiments of the present disclosure.

With reference to FIGS. 8 and 13, at least one, and optionally both, of the first and second housing halves 122a, 122b may include a retention tab 248 to secure the planetary gear system 136 within the housing 122 and to prevent rotation of the carrier 200 with respect to the housing 122. With reference to the first housing half 122a, the retention tab 248 may extend inwardly from the inner surface 226 towards the second housing half 122b and may be positioned between the first guide structure 238 and the second guide structure 240. The second housing half 122b may be similarly configured. An inner edge of the retention tab 248 may define an arcuate guide surface 250 having a radius of curvature sized to generally correspond with an outer diameter of the main body 204 of the carrier 200. The retention tab 248 may be positioned to engage the buttresses 202 of the carrier 200. For example, as shown in FIG. 13, each retention tab 248 has a top corner portion 252 engaging a first rib 202a on each side and a bottom corner portion 254 engaging adjacent top edges of the second and fourth ribs 202b, 202d.

Also, as shown in FIGS. 8 and 13, at least one, and optionally both, of the first and second housing halves 122a, 122a may include a retention recess 256 defined within the engagement surface 128, which is aligned within the same plane as the retention tabs 248, and shaped to match an outer periphery of a third rib 202c. Together, the retention tabs 248 and the retention recess 256 lock the carrier 200, if provided, within the housing 122 and prevent rotational movement of the carrier 200 relative to the housing 122. The fixed carrier 200, through the planet gears 198 attached to the posts 199, thus acts to support the planetary gear system 136 of the first drive assembly 132.

FIGS. 19 and 20 depict alternate embodiments of first and second housing halves 322a, 322b and a connection member 324 for mounting and housing the first pulley 348 and the second pulley 350 of FIGS. 16-18. In FIG. 19, the second housing halve 322b is removed to reveal the first pulley 348 and the second pulley 350 and the first and second operating cords 116, 146. In FIG. 20, the first housing half 322a is removed as are the first and second operating cords 116, 146 and the first and second operating elements 154, 156 for clarity in presentation of other structural features. The first pulley 348 and the second pulley 350 may be retained within the first and second housing halves 322a, 322b by bearing surfaces that allow the attached first and second pulleys 348, 350 to rotate therein. The first operating cord 116 may exit the housing halves 322a, 322b through an aperture 326 along a slanted engagement surface 328 as the first operating cord 116 is reversibly circulated through the aperture 326.

A first bearing surface 342 is defined by an inner wall 334a of the first housing half 322a and an inner wall 322b of the second housing half 322b. The first bearing surface 342 is formed by semicircular cutouts in opposing edges of the inner walls 322a, 322b as they meet at an interface between them in the housing halves 322a, 322b. The first bearing shaft 338 extending from the first pulley 348 extends through a hole defined by the semicircular cutouts, the edges of which define the first bearing surface 342 within which the first bearing shaft 338 rotates. The second housing half 322b further defines a retention plank 335 mounted on a support wall 337 extending (e.g., orthogonally or normally) from the inner wall 322b and extends to the edge of the first bearing surface 342. The retention plank 335 is oriented parallel to the inner wall 322b and extends outward over the hole defined by the first bearing surface 342 in a cantilevered configuration. The retention plank 335 thus limits potential axial movement of the first bearing shaft 338 and consequently axial movement of the first and second pulleys 348, 350 in the housing halves 322a, 322b to maintain the first and second pulleys 348, 350 in place.

A second bearing surface 371 may be formed as a cylindrical pocket in an outer wall of the housing halves 322a, 322b by semi-cylindrical recesses in opposing edges of the first and second housing halves 322a, 322b as they meet at an interface therebetween below the connection member 324. The second bearing shaft 340 extending through the bearing aperture 339 in the second pulley 350 may seat within the second bearing surface 371 and rotate therein.

Further, in the alternative exemplary embodiment depicted in FIGS. 19 and 20, the connection member 324 may be configured to receive the second operating cord 146 without the use of guide pulleys as in other embodiments. The connection member 324 may be formed with a pair of cord chutes 367 extending outward from an inner face thereof above a top edge of the second pulley 350. The cord chutes 367 may be formed to provide a transition path and guide surface for the second operating cord 146 between the head rail 112 and the second pulley 350. For example, the cord chutes 367 may be formed as concave channels extending along a downward curve or at an oblique angle from the horizontal orientation of the head rail 112. A pulley guide 367 may also extend from the inner face of the connection member 324 between the cord chutes 367 to a position substantially over the receiving groove 308b of the second pulley 350 in order to help retain the second operating cord 146 within the receiving groove 408b.

As noted above, the connection member 124 may be provided to facilitate mounting and/or coupling of the housing 122 to one end of the head rail 112. In some embodiments, the a connection member 124 may be integrated with the housing 122 or integrated with the head rail 112. Alternatively, the head rail 112, the housing 122, and the connection member 124 may be formed as a single, unified structure. Each of the first and second housing halves 122a, 122b and the connection member 124 may include alignment and/or retention features to secure the connection member 124 to the housing 122. For example, with reference to FIGS. 4 and 8, the first and second housing halves 122a may include a slot 257 defined within a third outer wall 258 and having a longitudinal length substantially parallel to a longitudinal axis of the head rail 112. Latch fingers 260 may extend away from the second outer wall 236 substantially parallel to the slot 257. Each latch finger 260 may include a protrusion 262 extending generally perpendicularly away from a lengthwise axis of the latch finger 260 and toward the slot 257. In such embodiments, the connection member 124 may include ribs 264 and latch recesses 266 that correspond with the slots 257 and protrusions 262 of the first and second housing halves 122a, 122b, respectively (see FIGS. 4 and 10). As shown, each rib 264 may extend along a longitudinal length of an outer surface of a main body 268 of the connection member 124. Each latch recess 266 may be defined within a bottom surface 270 of the main body 268.

To secure the connection member 124 to the housing 122, the ribs 264 disposed on the connection member 124 may be received within the slots 257 of the housing 122 and the latch fingers 260 may extend across the bottom surface 270 of the main body 268 of the connection member 124 until the protrusions 262 project into the latch recesses 266. In some embodiments, the connection member 124 may be releasably secured to the housing 122 by the latch fingers 260 and prevented from rotation primarily by the interface of the ribs 264 within the slots 257. Additionally or alternatively, the connection member 124 may be secured to the housing 122 by adhesive, heat or sonic welding, mechanical fasteners, or any other suitable attachment means.

Figure 9:
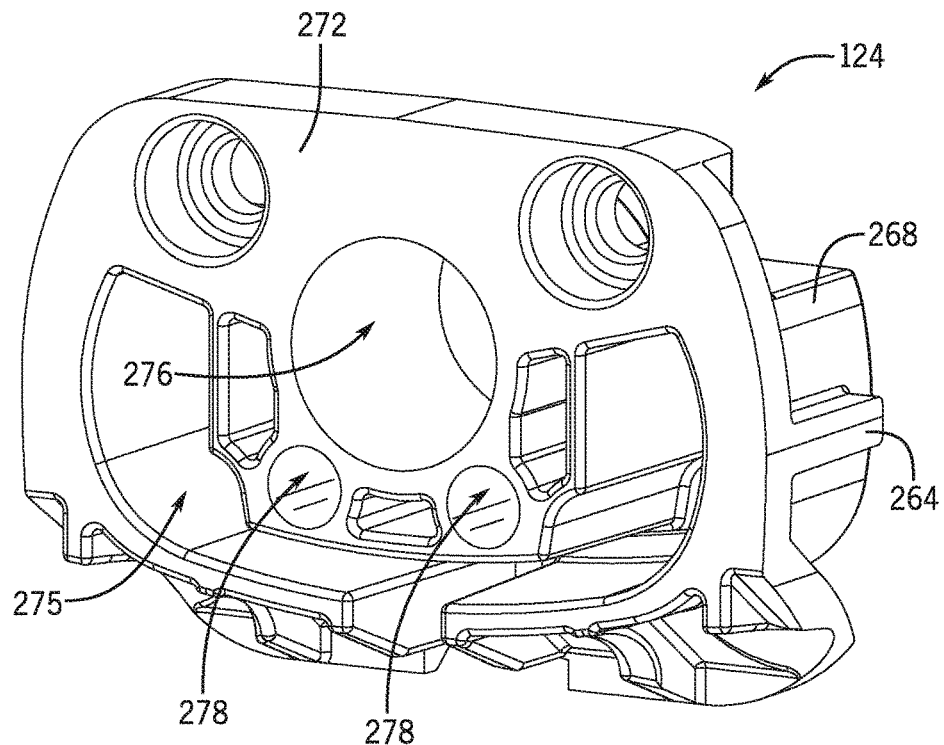
FIG. 9 is a front isometric view of a housing connection member in accordance with some embodiments of the present disclosure.
Figure 10:
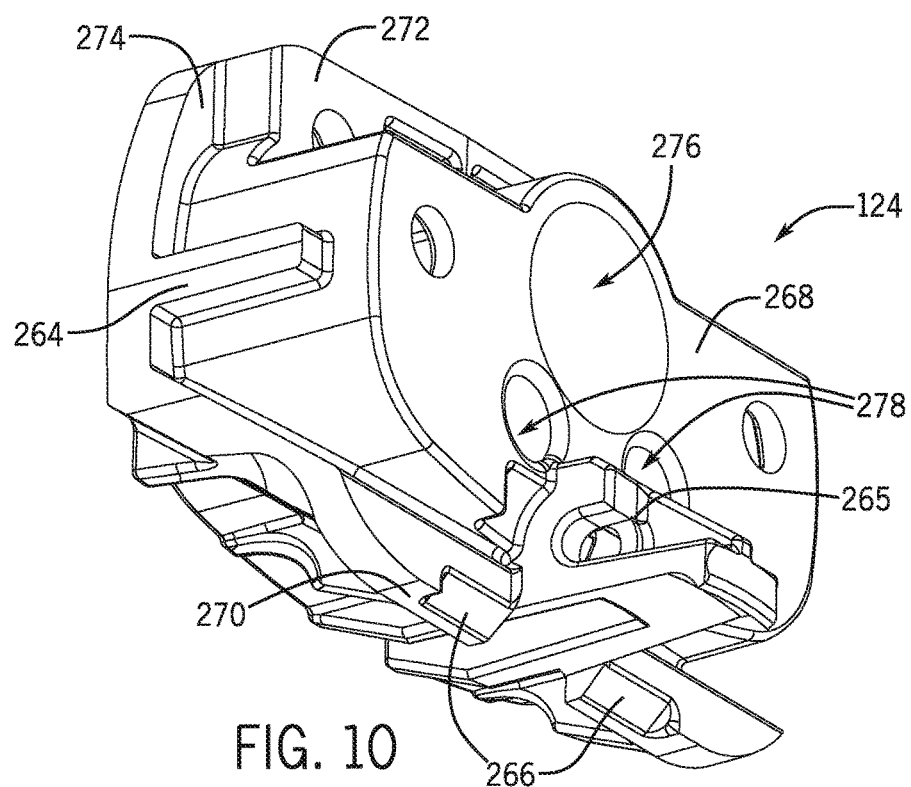
FIG. 10 is a rear isometric view of the housing connection member of FIG. 9 in accordance with some embodiments of the present disclosure.

With continued reference to FIGS. 9 and 10, the connection member 124 may include a flange 272 extending from an end of the main body 268 substantially perpendicular to the ribs 264. The flange 272 may abut against an end of the housing 122 to axially locate the connection member 124 relative to the housing 122. For example, the main body 268 of the connection member 124 may slide into the housing 122 until an end of the housing 122 abuts an inner surface 274 of the flange 272 (see FIG. 2). The main body 268 and the flange 272 may include a drive aperture 276 (further described below) and two cord apertures 278 defined there through. The cord apertures 278 may be sized to slidably receive the second operating cord 146 (see FIG. 8). In such embodiments, rotation of the planetary gear system 136 causes first and second horizontal runs 146a, 146b of the second operating cord 146 to slide or pass through the cord apertures 278 of the connection member 124 (see FIG. 12). The main body 268 and the flange 272 may define a cavity 275 therein for receipt of a portion (e.g., an end) of the head rail 112. The portion of the head rail 112 received within the cavity 275 may be coupled to the connection member 124 by adhesive, heat or sonic welding, mechanical fasteners, or any other suitable attachment means.

As noted above, and as shown in FIG. 11, first and second vertical runs 116a, 116b of the first operating cord 116 may be routed through the aperture 126 of the housing 122 adjacent the engagement surface 128. The first operating cord 116 may be routed around a majority of the first pulley 148 of the planetary gear system 136 and adjacent the first guide structures 238 of the first and second housing halves 122a, 122b. As shown, the first operating cord 116 may be engaged with a majority of the alternating ridge structures 206a of the first pulley 148 so that manipulation of the vertical runs 116a, 116b of the first operating cord 116 causes the first pulley 148 to rotate about the common rotational axis of the planetary gear system 136. For example, pulling the first vertical run 116a away from the housing 122 may cause the first pulley 148 to rotate in a first rotational direction (e.g., clockwise in FIG. 11). Pulling the second vertical run 116b away from the housing 122 may cause the first pulley 148 to rotate in a second rotational direction (e.g., counter-clockwise in FIG. 11). As explained below, reversible rotation of the first pulley 148 may cause the second pulley 150 to reversibly circulate the second operating cord 146 through the cord apertures 278 and along a length of the head rail 112 (see FIG. 12). As explained above, the carrier 200 of the planetary gear system 136 remains stationary during rotation of the first pulley 148 (see FIG. 13).

With reference to FIG. 12, the second operating cord 146 may be routed around a majority of the second pulley 150 of the planetary gear system 136 and adjacent the second guide structures 240 of the first and second housing halves 122a, 122b. In some embodiments, the second operating cord 146 may be engaged with a majority of the alternating ridge structures 206b of the second pulley 150 so that rotation of the second pulley 150 causes the first and second horizontal runs 146a, 146b of the second operating cord 146 to slide or pass through the cord apertures 278 of the connection member 124. For example, rotation of the second pulley 150 in a first rotational direction (e.g., clockwise in FIG. 12) may cause the second horizontal run 146b to pass through one of the cord apertures 278 toward the head rail 112. Rotation of the second pulley 150 in a second rotational direction (e.g., counter-clockwise in FIG. 12) may cause the first horizontal run 146a to pass through the other of the cord apertures 278 toward the head rail 112. As explained above, the carrier 200 of the planetary gear system 136 may remain stationary during rotation of the second pulley 150 (see FIG. 13).

As shown in FIGS. 3 and 4, the second drive assembly 134 may also be rotatably mounted (e.g., within the housing 122) and operable to move the shade in a second manner, such as between a closed configuration and an open configuration. For example, in some embodiments such as shown in FIGS. 3 and 12, the second drive assembly 134 may rotate a driven element, such as a rail shaft 130 extending along the head rail 112, in order to further rotate the vanes 114 between the closed and open configurations. Rotation of the second drive assembly 134 in a first direction may rotate the vanes 114 to a closed configuration with vanes 114 rotated with their front either toward or away from the housing 122. Rotation of the second drive assembly 134 in a second direction (e.g., opposite the first direction) may rotate the vanes 114 to the opposite closed configuration with vanes 114 rotated with their front in the opposite direction. The operating wand 115 may be coupled to the second drive assembly 134 to control the second drive assembly 134 through manipulation of the operating wand 115.

Referring to FIGS. 3, 4, 14, and 15, the second drive assembly 134 may include the first operating element 154 and a second operating element 156 operably coupled to (e.g., rotationally coupled to) the first operating element 154. In one embodiment, each of the first and second operating elements 154, 156 may be in the form of a gear member. A first end 158 of the first operating element 154 may be pivotably attached to an end of the operating wand 115. A second end 166 of the first operating element 154 may be operably engaged with a first end 164 of the second operating element 156, such as on an outer circumferential surface thereof. The first operating element 154 may thus extend at an angle (e.g., less than 90 degrees, greater than 90 degrees, or 90 degrees) from the axis of rotation of the second operating element 156. However, the first operating element 154 may extend out of the housing 122 at an oblique angle to vertical such that the first end 158 is oriented away from the wall 119 of the mounting surface and into the room for easier access and manipulation of the operating wand 115. A second end 157 of the second gear member 156 may be engaged with the rail shaft 130 (for controlling the position of the covering material, such as by pivoting vanes of the material between open and closed positions) and extend therefrom in axial alignment with the axis of the rail shaft 130, as discussed in further detail below.

In some embodiments, the operating wand 115 is secured to the first operating element 154. For example, and without limitation, the operating wand 115 may be releasably secured to the first end 158 of the first operating element 154. For example, a securing clip 160 may be fixed to the top end of the operating wand 115. A U-shaped loop 161 may be fixed at both ends on lateral sides of the securing clip 160 and extend above a top surface thereof. The loop 161 may be received through an aperture 162 defined in a shaft portion 155 of the first operating element 154 at the first end 158 to thereby attach the first operating element 154 to an end of the operating wand 115 via the securing clip 160 and loop 161. As such, the operating wand 115 may be operable to rotate the first operating element 154 about its longitudinal axis. The pivoting connection of the loop 161 within the aperture 162 of the first operating element 154 may be operable to position a longitudinal axis of the operating wand 115 at an oblique angle relative to a longitudinal axis of the first operating element 154, which allows the longitudinal axis of the operating wand 115 to remain in a vertical orientation with respect to the mounting surface 119 and architectural structure/feature. In another exemplary embodiment, the wand may extend from the first operating element 154 at an angle to the mounting surface 119, in which orientation the wand angles into the room and away from the mounting surface as it extends downwardly from the head rail.

In operation, as a user grasps the operating wand 115 to manipulate the covering 110, the user generally naturally angles the operating wand 115 into the room. In prior arrangements, as the user lifts a wand into the room, the resulting angle between an operating element at the hinge interface between the wand and the operating element decreases from 180°. As the user tries to rotate the wand to adjust the shade, the hinge interface of prior arrangements will rotate and can abut the operating element, causing the hinge interface, the cord loop, and the operating element to bind in prior arrangements. In one embodiment of the present disclosure, the first operating element 154 may be angled into the room to preferably achieve an angle of as close to 180° as possible between the first operating element 154 and the securing clip 160 coupled to the top of the operating wand 115 when the user holds and operates the operating wand 115 (based on an average angle at which a typical user would hold the operating wand 115), thereby mitigating potential binding. An outside angle between the first operating element 154 and the operating wand 115 is thus preferably greater than 180° so that when the operating wand 115 is pulled into the room by the user the resulting angle is approximately 180° to optimize torque transfer from the operating wand 115 to the first operating element 154 (i.e., the operating wand 115 transfers torque best when the angle between the operating wand 115 and the first operating element 154 is as close to 180° as possible).

Figure 14:
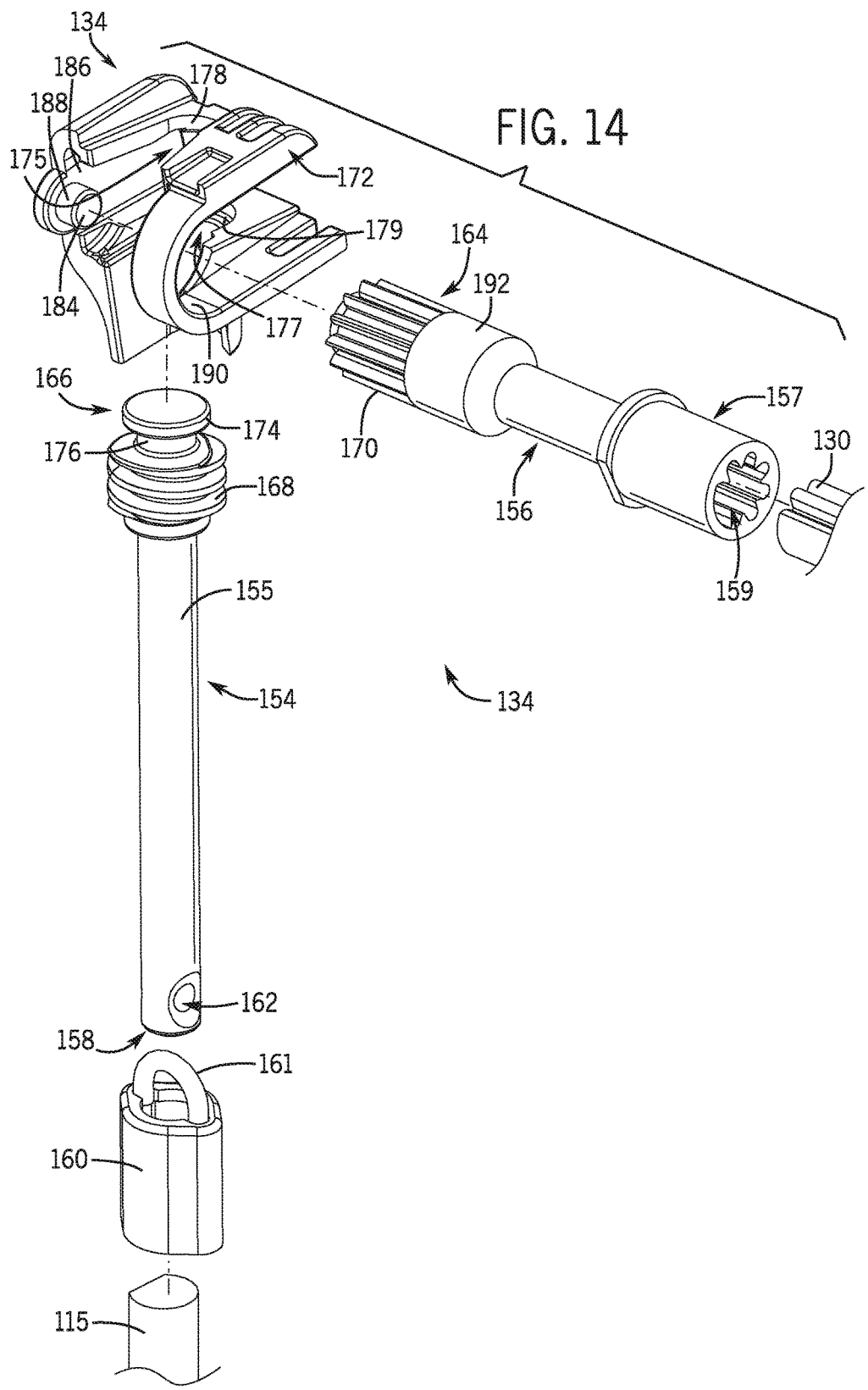
FIG. 14 is an exploded front isometric view of the second drive assembly shown in FIG. 4 in accordance with some embodiments of the present disclosure.
Figure 15:
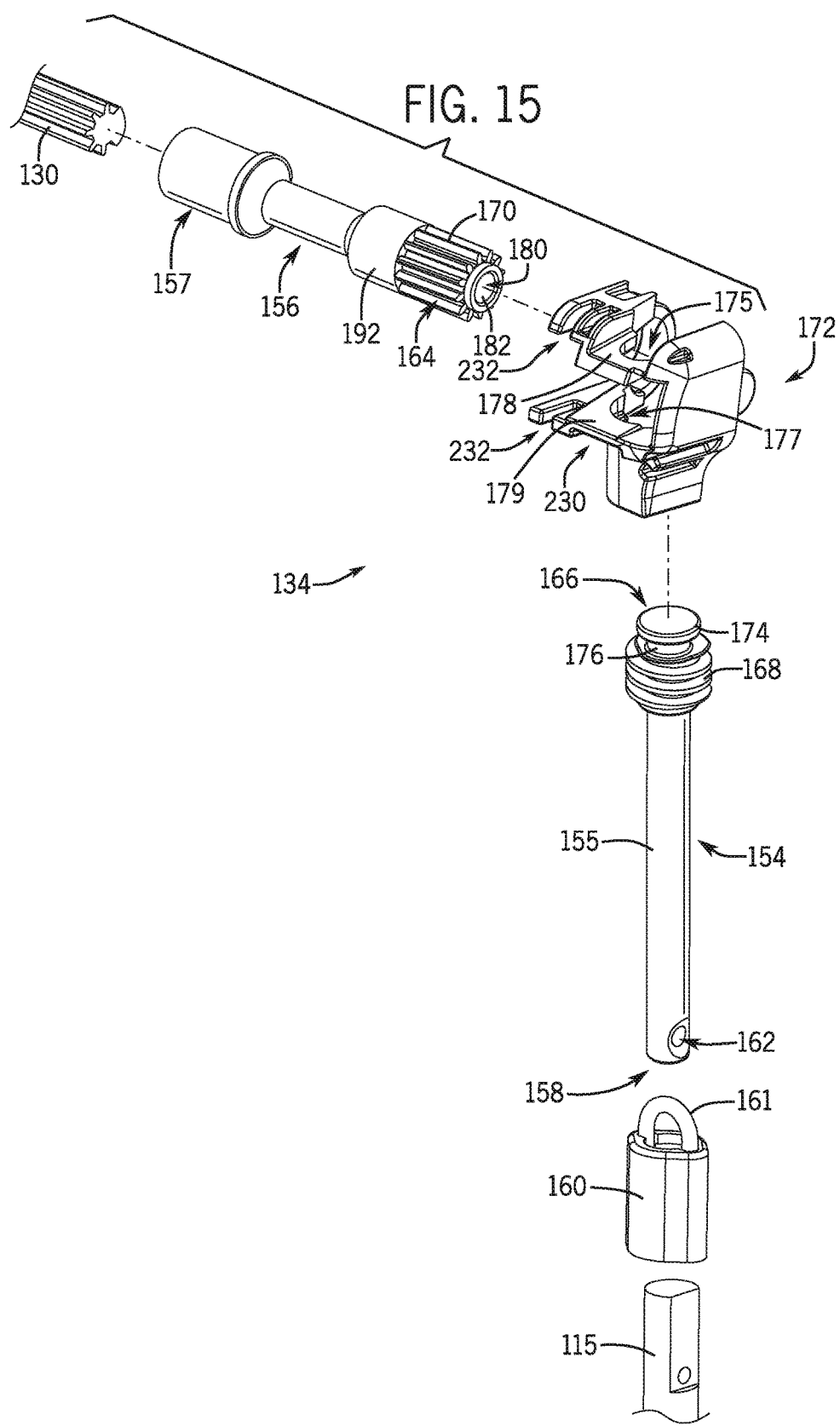
FIG. 15 is an exploded rear isometric view of the second drive assembly shown in FIG. 4 in accordance with some embodiments of the present disclosure.

The first end 164 of the second operating element 156 may mesh with and engage the second end 166 of the first operating element 154 as shown in FIGS. 3 and 4. In some embodiments, the second operating element 156 may extend substantially perpendicularly to the first operating element 154. In one embodiment, the first operating element 154 may extend at an angle (e.g., an acute angle) relative to vertical. The second drive assembly 134 may include a worm drive operable to move the shade between closed and open configurations. As shown in the embodiment of FIGS. 4, 14, and 15, the second end 166 of the first operating element 154 includes a first gear mesh portion (e.g., a worm screw 168), and the first end 164 of the second operating element 156 includes a second gear mesh portion (e.g., a worm gear 170) engaged with the first gear mesh portion, such as the worm screw 168 enmeshed with the worm screw 168. With reference to FIG. 4, reversible rotation of the second drive assembly 134 may cause the vanes 114 to move between open and closed configurations. For example, rotation of the first operating element 154 in a first direction (e.g., counterclockwise) rotates the worm screw 168 at the second end 166 thereof. The gear mesh between the worm screw 168 and the worm gear 170 causes the second operating element 156 and, correspondingly, the rail shaft 130 coupled to the second operating element 156 to rotate in a first rotational direction (e.g., clockwise in FIG. 12) to rotate the vanes 114 such that their front surfaces rotate either toward or away from the housing 122. Similarly, rotation of the first operating element 154 in a second direction (e.g., clockwise) rotates the worm screw 168. The gear mesh between the worm screw 168 and the worm gear 170 causes the second operating element 156 and the rail shaft 130 to rotate in a second rotational direction (e.g., counter-clockwise in FIG. 12) to rotate the vanes 114 such that their front rotates in the opposite direction.

As shown in FIGS. 12 and 14, the second end 157 of the second operating element 156 may define an aperture 159 in an end thereof configured to receive an end of the rail shaft 130. A cross-section of an embodiment of a rail shaft 130 may define a non-uniform shape, for example, with multiple flutes or lobes that are designed to interact with a mechanical assembly (not shown) that rotates the vanes 114. The aperture 159 in the second operating element 156 may correspond to the cross-section of the rail shaft 130 in order to prevent relative rotation between the second operating element 156 and the rail shaft 130. The second end 157 of the second operating element 156 also fits within the drive aperture 276 of the connection member 124. (See FIG. 10.) The second end 157 may be understood as a journal supported by the connection member 124 which acts as a bearing. The second operating element 156 thus extends outwardly from an end of the rail shaft 130 along the same longitudinal axis as the rail shaft 130 along a midline between the first and second housing halves 122a, 122b of the housing 122.

Figure 11:
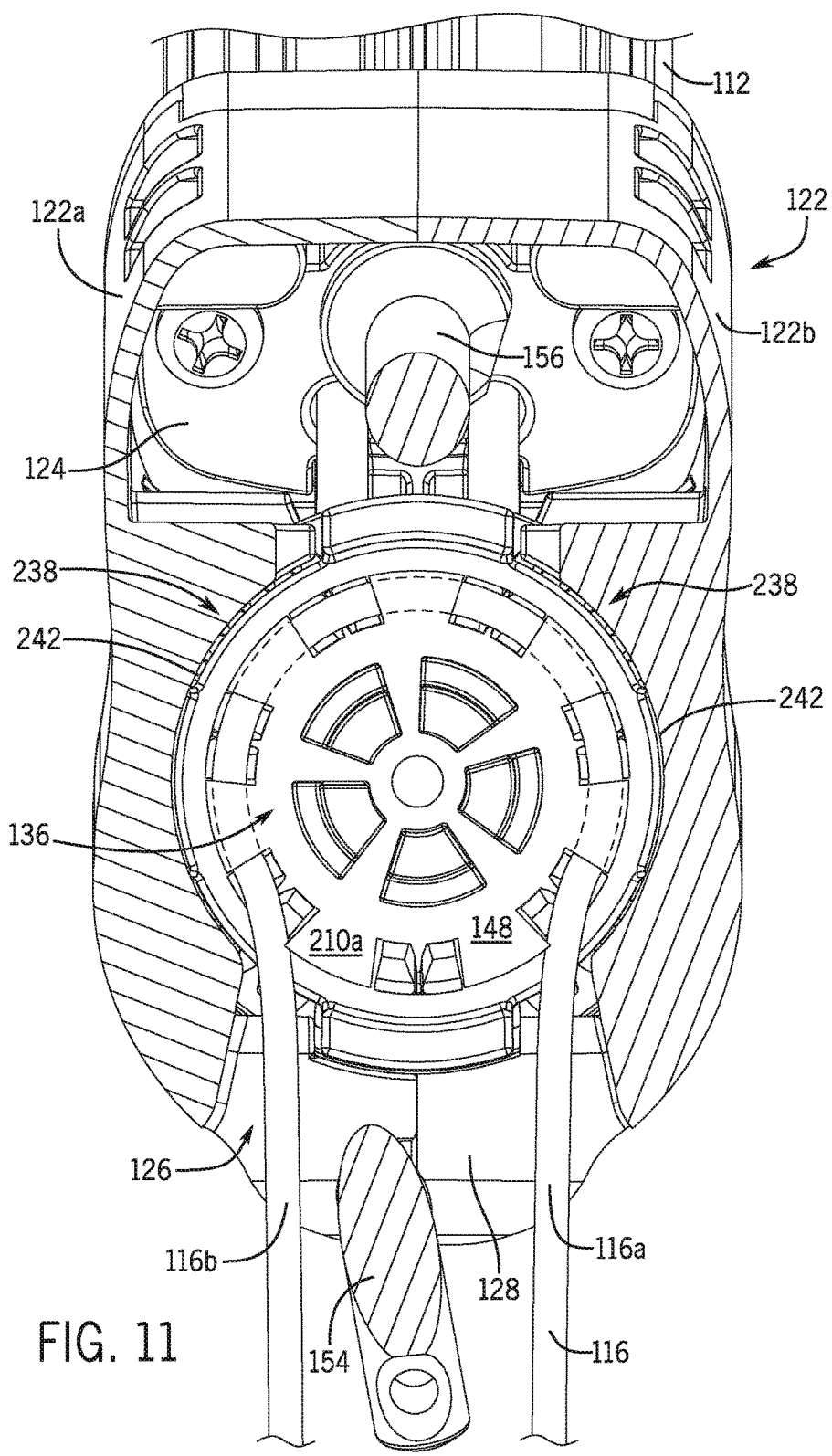
FIG. 11 is a cross-sectional view of the covering of FIG. 1 taken along line 11-11 of FIG. 3 in accordance with some embodiments of the present disclosure.

The first operating element 154 may be positioned at an angle relative to the vertical midline of the housing 122 such that the first end 158 of the first operating element 154 is positioned substantially along the vertical midline of the housing 122 while the second end 166 of the first operating element 154 is offset from the vertical midline and is rather adjacent and behind the first end 164 of the second operating element 156 (see FIGS. 4 and 11). In this configuration, the operating wand 115 may hang vertically below the vertical midline of the housing 122 where it attaches to the first end 158 of the first operating element 154. Thus, while the second end 166 is behind the first end 164 of the second operating element 156, the first end 158 extends forward such that the connection with the operating wand 115 is on the vertical midline. This forces the first operating cord 116 to route symmetrically on either side of the connection between the first operating element 154 and the operating wand 115. The symmetry is advantageous when the first operating cord 116 is pre-tensioned; if the two portions of the first operating cord 116 were not symmetric, then the first operating cord 116 would pull on one side of the operating wand 115 more than the other and could cause a wand-kick. However, this embodiment is exemplary only and the second operating element 156 need not be positioned along the midline of the housing 122 as long as it aligns with the rail shaft 130. Further, the first operating element 154 need not be adjacent and behind the first end 164 of the second operating element 156, but could be positioned in front of the second operating element 156 or in other positions so long as the gear meshes between the two are configured to mate appropriately for such positions.

In one embodiment, illustrated in FIGS. 14 and 15, a support cage 172 may be provided for a drive assembly of the covering 110, such as for the second drive assembly 134. In the illustrated embodiments, the support cage 172 is in the form of a frame or scaffold including a guide surface for holding a shaft of an operating element of the drive assembly at an oblique angle to vertical, as described more fully below. In one embodiment, the support cage 172 may surround the worm screw 168 and the worm gear 170 of the second drive assembly 134 to hold the worm screw 168 and the worm gear 170 in place relative to each other during operation of the second drive assembly 134. The support cage 172, which may be referred to simply as a scaffold, is operable to maintain continuous engagement of the worm screw 168 and the worm gear 170. In some embodiments, the second drive assembly 134 may be rotatably mounted within the support cage 172. In one embodiment, the support cage 172 substantially surrounds the worm screw 168 and the worm gear 170; however, in other embodiments, the support cage 172 may at least partially surround the worm screw 168 and the worm gear 170.

Referring to FIGS. 4, 14, and 15, the first operating element 154 may be positioned at a first location within the support cage 172. In an exemplary embodiment, the second end 166 of the first operating element 154 may define a flange 174 extending radially from a bearing surface 176 positioned between the flange 174 and the worm screw 168. The support cage 172 may include an arcuate locating strip 178 or web of material having dimensions corresponding with the space between the flange 174, the worm screw 168, and the bearing surface 176 of the first operating element 154 and defining a first pocket 175 for receiving the second end 166 of the first operating element 154. The locating strip 178, which may be referred to as a first arcuate web element, may seat against the bearing surface 176 of the first operating element 154, thus retaining the first operating element 154 within the support cage 172. The locating tab 178 may thus limit axial movement of the first operating element 154 relative to the support cage 172.

The support cage 172 may further define an arcuate alignment strip 179 or web of material that defines a second pocket 177 in the support cage 172 beneath and spaced apart from the arcuate locating strip 178. The arcuate alignment strip 179, which may be referred to as a guide surface and/or a second arcuate web element, is wider than the arcuate locating strip 178 and thus extends further toward the midline of the housing 122 than the arcuate locating strip 178. The shaft portion 155 of the first operating element 154 may be positioned within the first and second pockets 175, 177, such as resting against the arcuate locating and alignment strips 178, 179 as journals. In the illustrated embodiments, the arcuate alignment strip 179 holds the shaft portion 155 at an oblique angle to vertical, such as tilting the shaft portion 155 outward with respect to a surface defining the architectural structure/feature to which the covering 110 is associated. In one example, the difference in widths of the arcuate locating strip 178 and the arcuate alignment strip 179 causes the first operating element 154 to extend through the aperture 126 in the housing 122 at an oblique angle from vertical. For example, an edge of the alignment strip 179 defining the second pocket 177 may be offset from vertical alignment with an edge of the locating strip 178 defining the first pocket 175. In such embodiments, the shaft portion 155 may be held at an oblique angle to vertical when interfacing with the respective edges of the locating and alignment strips 178, 179. Though the first operating element 154 may extend at an oblique angle to vertical, the U-shaped loop 161 received through the aperture 162 in the shaft portion 155 of the first operating element 154 acts as a pivot or hinge allowing the wand 115 to hang vertically from the first operating element 154. Though the first operating element 154 may extend at an oblique angle to vertical, the first end 158 of the first operating element 154 may be positioned substantially below and aligned with the first end 164 of the second operating element 156.

As shown in FIG. 15, a bearing cavity 180 may be defined in the first end 164 of the second operating element 156 to position the second operating element 156 at a second location within the support cage 172. In some embodiments, the bearing cavity 180 may be defined by a substantially cylindrical inner surface 182 within the first end 164 of the second operating element 156. As shown in FIG. 14, the support cage 172 may include a boss 184 with a bearing surface 188 extending away from an inner face 186 of the support cage 172. The boss 184 may be received within the bearing cavity 180 to rotatably seat the second operating element 156 within the support cage 172. The inner surface 182 of the second operating element 156 may thus interface with the bearing surface 188 of the boss 184 to allow for rotation of the second operating element 156 against the boss 184.

The support cage 172 may be configured to maintain meshed engagement of the first operating element 154 with the second operating element 156. For instance, in one embodiment, the support cage 172 may include an arcuate engagement surface 190 to rotatably support a journal surface 192 of the second operating element 156. The arcuate engagement surface 190 is semi-cylindrical and spaced away from the inner face 186 of the support cage 172. Together, the arcuate engagement surface 190 and the boss 184 may function to maintain meshed engagement of the second operating element 156 with the first operating element 154 by limiting axial and radial movement of the second operating element 156 away from the first operating element 154.

The first and second housing halves 122a, 122b may each include corresponding retention features operable to receive the second drive assembly 134 within the housing 122. For example, as shown in FIG. 8, a support cavity 218 may be defined within the first housing half 122a and may be sized to receive and align the support cage 172 of the second drive assembly 134 within the housing 122. In one embodiment, the support cavity 218 may be defined, in part, by an arcuate first outer wall 220, a bottom wall 222, and an alignment wall 224 of the first housing half 122a. The bottom wall 222 and the alignment wall 224 may extend inwardly from an inner surface 226 of the first housing half 122a towards the second housing half 122b. In some embodiments, the bottom wall 222 may extend substantially parallel to the second operating element 156, and the alignment wall 224 may extend substantially perpendicular to the second operating element 156. In some embodiments, the alignment wall 224 may be attached to the first outer wall 220 and the bottom wall 222. The bottom wall 222 may include one or more alignment tabs 228 that may be received within one or more corresponding locating slots 230 of the support cage 172. To further align the support cage 172 within the housing 122, the alignment wall 224 may be received within one or more corresponding alignment grooves 232 defined within the support cage 172.

The foregoing description has broad application. While the provided examples describe a covering having vertical slats, it should be appreciated that the concepts disclosed herein may equally apply to many types of blinds, including Venetian-type blinds and vertical blinds or coverings. Accordingly, the discussion of any embodiment is meant only to be explanatory and is not intended to suggest that the scope of the disclosure, including the claims, is limited to these examples. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, the various features disclosed herein are separate and independent of one another. Accordingly, it should be appreciated that one feature may be present in an embodiment formed in accordance with the present disclosure without necessarily including other features disclosed herein. Further, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The phrases "at least one", "one or more", and "and/or", as used herein, are open-ended expressions that are both conjunctive and disjunctive in operation.

The term "a" or "an" entity, as used herein, refers to one or more of that entity. As such, the terms "a" (or "an"), "one or more" and "at least one" can be used interchangeably herein.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

What is claimed is:

1. A covering for an architectural structure or feature, said covering comprising:
    a head rail;
    a covering material depending from said head rail; and
    an operating system comprising:
        a first drive assembly operable to move said covering material between an extended configuration and a retracted configuration, said first drive assembly including a first pulley and a second pulley coupled to and driven by said first pulley; and
        a second drive assembly including an operating wand having a longitudinal axis, said operating wand operable to move said covering material between a closed configuration and an open configuration;
    wherein:
        said first drive assembly comprises a cord loop including a first segment and a second segment, said first segment of said cord loop, said second segment of said cord loop, and said wand are all aligned with one another with said first segment of said cord loop positioned on a first side of said longitudinal axis of said operating wand and said second segment of said cord loop is positioned on a second, opposite side of said longitudinal axis of said operating wand; and
        said first pulley including a longitudinal axis of rotation, said longitudinal axis of rotation of said first pulley is angled relative to a longitudinal axis of said operating wand.

2. The covering of claim 1, wherein
said cord loop of said first drive assembly includes:
    a first operating cord loop extending around said first pulley and positioned for access by a user, said first operating cord loop including said first and second segments of said cord loop; and
    a second operating cord loop extending around said second pulley to travel along said head rail, said second operating cord loop being separate and distinct from said first operating cord loop.

3. The covering of claim 2, wherein:
said first pulley has a first diameter; and
said second pulley has a second diameter that is less than said first diameter such that a mechanical advantage is achieved between said first pulley and said second pulley.

4. The covering of claim 2, wherein:
said first drive assembly comprises a gear reduction system;
one of said first and second pulleys is fixed to a first gear of said gear reduction system; and
the other of said first and second pulleys is fixed to a second gear of said gear reduction system.

5. The covering of claim 4, wherein:
said gear reduction system comprises a planetary gear system including:
    a sun gear;
    a ring gear; and
    a plurality of planet gears rotatably mounted on a carrier;
said first gear comprises said sun gear of said planetary gear system;
said second gear comprises said ring gear of said planetary gear system; and
said carrier is stationary.

6. The covering of claim 1, wherein said second drive assembly comprises:
    a first operating element including said operating wand; and
    a second operating element rotationally engaged with said first operating element.

7. The covering of claim 6, wherein said longitudinal axis of said first operating element defines a longitudinal axis of rotation extending substantially perpendicularly to an axis of rotation of said second operating element.

8. The covering of claim 6, wherein said second drive assembly includes a support cage that holds said first operating element and said second operating element in place relative to each other.

9. The covering of claim 6, further comprising a driven element coupled with said second operating element and said covering material to move said covering material between said closed and open configurations upon actuation of said second drive assembly.

10. The covering of claim 1, wherein said operating wand of said second drive assembly includes a rotatable shaft rotatable to move said covering material between said closed configuration and said open configuration.

11. The covering of claim 1, wherein at least a portion of said first segment of said cord loop and at least a portion of said second segment of said cord loop extend substantially parallel to said longitudinal axis of said operating wand.

12. The covering of claim 1, wherein said longitudinal axis of rotation of said first pulley is angled relative to a longitudinal axis of said cord loop so that said longitudinal axis of said cord loop transitions from engagement with said first pulley to a position substantially aligned with said longitudinal axis of said operating wand.

13. A covering for an architectural structure or feature, said covering comprising:
a first drive assembly including a first cord loop and a second cord loop, said first drive assembly operable to move said covering between an extended configuration and a retracted configuration;
a second drive assembly including an operating wand including a longitudinal axis, said operating wand accessible by a user, said operating wand operable to move said covering between a closed configuration and an open configuration; and
a transmission system coupling said first cord loop with said second cord loop, said transmission system including an axis of rotation, said axis of rotation of said transmission system is angled with respect to a plane of at least one of said first and second cord loops;
wherein:
said first cord loop extends from said transmission system and along said operating wand;
said second cord loop extends from said transmission system and is operable to travel along a head rail; and
a tension force on said second cord loop is decoupled by said transmission system from directly acting on the operating wand.

14. The covering of claim 13, wherein said transmission system further includes:
a first pulley; and
a second pulley coupled to and driven by said first pulley;
wherein:
said first cord loop extends around said first pulley and away from said transmission system for access by a user along a length of said operating wand; and
said second cord loop extends around said second pulley and away from said transmission system.

15. The covering of claim 14, wherein said first pulley is larger than said second pulley to impart a mechanical advantage to said transmission system.

16. The covering of claim 14, wherein said transmission further comprises a gear reduction system in which said first pulley is fixed to a first gear of said gear reduction system and said second pulley is fixed to a second gear of said gear reduction system.

17. The covering of claim 16, wherein:
said gear reduction system comprises a planetary gear system including:
a sun gear;
a ring gear;
a plurality of planet gears rotatably mounted on a stationary carrier, each of said planet gears interfacing with said sun gear and said ring gear;
said first gear comprises said sun gear of said planetary gear system; and
said second gear comprises said ring gear of said planetary gear system.

18. The covering of claim 13, wherein:
said second drive assembly includes a first operating element with a first gear surface at a first end and a connection structure at a second end for engagement with said operating wand;
a second operating element with a second gear surface; and
a first axis of rotation of said first operating element extends substantially perpendicularly to a second axis of rotation of said second operating element.

19. The covering of claim 18, wherein:
said second drive assembly further comprises a shaft in fixed engagement with said second operating element; and
said shaft extends along a longitudinal axis of the head rail and is operably coupled to one or more covering panels to move said covering panels between closed and open configurations.

20. The covering of claim 18, wherein said second drive assembly includes a support cage mounted within a housing that holds said first operating element and said second operating element in place relative to each other.

21. The covering of claim 20, wherein said support cage holds said first operating element at an oblique angle with respect to vertical.

22. The covering of claim 13, wherein said first cord loop is coupled with said operating wand.

23. A covering for an architectural structure or feature, said covering comprising:
a first drive assembly including a first cord loop and a second cord loop, said first drive assembly operable to move said covering between an extended configuration and a retracted configuration;
a second drive assembly including an operating wand having a longitudinal axis, said operating wand accessible by a user, said operating wand operable to move said covering between a closed configuration and an open configuration; and
a transmission system including:
a first pulley; and
a second pulley coupled to and driven by said first pulley;
wherein:
said first cord loop extends around said first pulley and away from said transmission system for access by a user along a length of said operating wand;
said second cord loop extends around said second pulley and away from said transmission system;
said first and second pulleys including an axis of rotation, said axis of rotation of said first and second pulleys lying in a plane that is angled with respect to said first and second cord loops.

24. The covering of claim 23, wherein said transmission system further comprises a gear reduction system, one of said first and second pulleys is fixed to a first gear of said gear reduction system, the other of said first and second pulleys is fixed to a second gear of said gear reduction system.

25. The covering of claim 24, wherein:
said gear reduction system comprises a planetary gear system including:
a sun gear;
a ring gear; and
a plurality of planet gears rotatably mounted on a carrier;
said first gear comprises said sun gear of said planetary gear system;
said second gear comprises said ring gear of said planetary gear system; and
said carrier is stationary.

26. The covering of claim 23, wherein:
said first pulley has a first diameter; and
said second pulley has a second diameter that is less than said first diameter such that a mechanical advantage is achieved between said first pulley and said second pulley.

27. The covering of claim 23, wherein said second drive assembly further comprises an operating element rotationally associated with said operating wand so that rotation of said operating wand rotates said operating element.

28. The covering of claim 27, wherein said longitudinal axis of said operating wand extends substantially perpendicularly to an axis of rotation of said operating element.

29. The covering of claim 27, further comprising a support cage that holds said operating wand and said operating element in place relative to each other.

30. The covering of claim 27, further comprising a driven element coupled with said operating element to move a covering material between said closed and open configurations upon actuation of said operating wand.

31. The covering of claim 23, wherein a tension force on said second cord loop is decoupled by said transmission system from directly acting on the operating wand.

32. The covering of claim 23, wherein said operating wand is operatively associated with an operating element having a first gear surface at a first end.

33. The covering of claim 32, further comprising a second operating element with a second gear surface;

wherein a first axis of rotation of said operating element extends substantially perpendicularly to a second axis of rotation of said second operating element.

34. The covering of claim 23, wherein said operating wand includes a rotatable shaft so that rotation of said operating wand about said longitudinal axis moves said covering material between said closed configuration and said open configuration.

35. The covering of claim 23, wherein said first cord loop includes a first segment and a second segment, at least a portion of said first segment of said first cord loop and at least a portion of said second segment of said first cord loop extends substantially parallel to said longitudinal axis of said operating wand.

* * * * *